(12) United States Patent
Li et al.

(10) Patent No.: US 11,391,575 B2
(45) Date of Patent: Jul. 19, 2022

(54) POSITIONING METHOD AND ELECTRONIC DEVICE

(71) Applicant: Huawei Technologies Co., Ltd., Shenzhen (CN)

(72) Inventors: Minzhen Li, Shanghai (CN); Lei Ma, Shanghai (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/357,229

(22) Filed: Jun. 24, 2021

(65) Prior Publication Data

US 2021/0325190 A1 Oct. 21, 2021

Related U.S. Application Data

(63) Continuation of application No. PCT/CN2019/124109, filed on Dec. 9, 2019.

(30) Foreign Application Priority Data

Dec. 26, 2018 (CN) .......................... 201811601395.5

(51) Int. Cl.
*G01C 21/30* (2006.01)
*G01S 13/89* (2006.01)

(52) U.S. Cl.
CPC .............. *G01C 21/30* (2013.01); *G01S 13/89* (2013.01)

(58) Field of Classification Search
None
See application file for complete search history.

(56) References Cited

U.S. PATENT DOCUMENTS

| 9,792,521 B2 * | 10/2017 | Modica ................. G01S 5/0252 |
| 10,446,027 B1 * | 10/2019 | Patel ...................... G08G 1/137 |
| 10,922,969 B2 * | 2/2021 | Song ...................... G08G 1/207 |
| 2015/0149073 A1 | 5/2015 | Ishigami et al. |
| 2017/0329019 A1 | 11/2017 | Croyle |

FOREIGN PATENT DOCUMENTS

| CN | 103033832 A | 4/2013 |
| CN | 103323013 A | 9/2013 |
| CN | 104359484 A | 2/2015 |
| CN | 104567885 A | 4/2015 |
| CN | 103791910 B | 4/2016 |
| CN | 104236565 B | 5/2017 |
| CN | 106696961 A | 5/2017 |
| CN | 107339996 A | 11/2017 |
| CN | 107462911 A | 12/2017 |

(Continued)

*Primary Examiner* — Todd Melton
(74) *Attorney, Agent, or Firm* — Conley Rose, P.C.

(57) ABSTRACT

A positioning method includes calculating, based on data that is of collection points at a road edge and that is collected by a radar, a feature of a road on which a terminal device is actually located, determining, from a plurality of candidate roads based on the feature of the road on which the terminal device is actually located and features of the plurality of candidate roads, a target road matching original positioning coordinates of the terminal device, and correcting the original positioning coordinates using the target road, to obtain corrected positioning coordinates.

20 Claims, 24 Drawing Sheets

(56) References Cited

FOREIGN PATENT DOCUMENTS

| | | | |
|---|---|---|---|
| CN | 107764274 | A | 3/2018 |
| CN | 108226924 | A | 6/2018 |
| CN | 108592934 | A | 9/2018 |
| CN | 108802769 | A | 11/2018 |
| EP | 0921509 | A2 | 6/1999 |
| EP | 2889641 | A1 | 7/2015 |
| WO | 2014002211 | A1 | 1/2014 |

* cited by examiner

POSITIONING METHOD AND ELECTRONIC DEVICE

CROSS-REFERENCE TO RELATED APPLICATIONS

This application is a continuation of International Patent Application No. PCT/CN2019/124109 filed on Dec. 9, 2019, which claims priority to Chinese Patent Application No. 201811601395.5, filed on Dec. 26, 2018. The disclosures of the aforementioned applications are hereby incorporated by reference in their entireties.

TECHNICAL FIELD

The present disclosure relates to communications technologies, and more specifically, to a positioning method and an electronic device.

BACKGROUND

Obtaining current vehicle location information through a positioning system is indispensable for manual driving, assisted driving, and automatic driving, and provides strong support for decision-making and planning. Map matching is one of important parts of the positioning system. A road that matches the vehicle location information is selected from a plurality of roads on an electronic map, the vehicle location information is corrected to the matched road, and the road on which a user is located is presented to the user such that the user learns a current location at which the user is located.

In an elevated road region, there is usually a case in which roads are stacked. As shown in FIG. 1, road stacking refers to a structure in which roads located at different spatial layers are roughly parallel in a horizontal direction, and an upper-layer road surface A and a lower-layer road surface B partially or entirely overlap in a vertical direction. In a drawing process of the electronic map, stacked roads at an upper layer and a lower layer are usually abstracted into two road lines. As shown in FIG. 2, it can be seen from enlarged diagrams of a region A and a region B in the figure that stacked roads in the region A and the region B are similar in geometric shapes and close in geometric locations. It is difficult to accurately distinguish, during positioning, a road on which a user is currently located. Therefore, precision of a provided positioning service is relatively low.

SUMMARY

Embodiments of this application provide a positioning method, to accurately distinguish a road on which a user is currently located, and provide a high-precision positioning service.

To achieve the objectives of the present disclosure, according to a first aspect, an embodiment of this application provides a positioning method. The method includes obtaining coordinates of a terminal device, data of a plurality of collection points of a road divider, and features of a plurality of candidate roads, where the plurality of candidate roads are roads that are in map data and that are located in a first range of the coordinates of the terminal device, the road divider is an edge of a road on which the terminal device is located, and the plurality of collection points of the road divider are collection points obtained when a sensor collects the road divider. The road divider may be a road edge, a road fence, a concrete pad, or a tree that is used to divide two roads. The sensor may be a radar, and may be a millimeter-wave radar.

The method further includes calculating, based on the data of the plurality of collection points of the road divider, a feature of the road on which the terminal device is located, where the feature of the road on which the terminal device is located is used to indicate a change in a shape of the road on which the terminal device is located, selecting a target road from the plurality of candidate roads based on the feature of the road on which the terminal device is located and the features of the plurality of candidate roads, and matching the coordinates of the terminal device to the target road, to obtain corrected coordinates of the terminal device. The coordinates of the terminal device may be original coordinates calculated based on a positioning signal received by the terminal device, or coordinates obtained after the original coordinates are corrected, or coordinates of the terminal device at a current moment that are predicted based on positioning coordinates of the terminal device in a historical positioning result.

The feature of the road on which the terminal device is located may be used to distinguish different roads, or may be used to distinguish road types. An example in which the road edge is the road divider is used. The feature of the road may include a change degree of a slope of the road edge, and may further include a change degree of a distance between a road edge collection point and the terminal device. A road on which the terminal device is actually located, namely, the target road, may be accurately selected from the plurality of candidate roads based on the calculated feature of the road on which the terminal device is actually located and the features of the plurality of candidate roads. Therefore, road matching is performed on the terminal device, and the coordinates of the terminal device are matched to the target road. Coordinates of projected points of the coordinates of the terminal device on a line segment representing the target road may be used as the corrected coordinates of the terminal device that are obtained after the road matching.

In some possible implementations, the features of the plurality of candidate roads include types of the plurality of candidate roads. The selecting a target road from the plurality of candidate roads based on the feature of the road on which the terminal device is located and the features of the plurality of candidate roads may include determining, based on the feature of the road on which the terminal device is located, a type of the road on which the terminal device is located, and selecting the target road from the plurality of candidate roads based on the type of the road on which the terminal device is located and the types of the plurality of candidate roads. The type of the road on which the terminal device is located is an elevated road or a non-elevated road, and the type of each of the plurality of candidate roads is an elevated road or a non-elevated road. In an elevated region scenario, a positioning service is affected by road stacking. Consequently, it is difficult to accurately select, from the plurality of candidate roads, the road on which the terminal device is actually located. A type of the road on which the terminal device is actually located may be distinguished using the feature that is collected and calculated by the sensor and that is of the road on which the terminal device is located. The types of the plurality of candidate roads can be obtained from common map data. Therefore, the target road can be accurately selected in an elevated region, to provide a high-precision positioning service.

In some possible implementations, the determining, based on the feature of the road on which the terminal device is located, a type of the road on which the terminal device is located includes determining, based on the feature of the road on which the terminal device is located, a type of an intersection at which the terminal device is located. The type of the intersection is an intersection of the elevated road or an intersection of the non-elevated road, and the intersection at which the terminal device is located is an intersection at which the terminal device is currently located. In a road stacking region, high-precision positioning may be obtained according to the positioning method provided in this application when the terminal device crosses an intersection in a moving process. This has a relatively wide range of application scenarios.

In some possible implementations, the determining, based on the feature of the road on which the terminal device is located, a type of the road on which the terminal device is located includes, if the feature of the road on which the terminal device is located meets a preset threshold, determining the type of the intersection at which the terminal device is located. The type of the intersection is the intersection of the elevated road or the intersection of the non-elevated road.

In some possible implementations, the feature of the road on which the terminal device is located includes one or more of an average value of slopes of the road divider at the plurality of collection points, a variance of the slopes of the road divider at the plurality of collection points, an average value of distances between the plurality of collection points and the terminal device, and a variance of the distances between the plurality of collection points and the terminal device.

In some possible implementations, the determining, based on the feature of the road on which the terminal device is located, a type of the road on which the terminal device is located includes obtaining coordinates of one or more moving targets collected by the sensor, where the coordinates of the moving target are coordinates of the moving target relative to the sensor, calculating a movement feature of the one or more moving objects based on the coordinates of the one or more moving objects, where the movement feature is used to indicate a movement state of the moving object, and determining, based on the movement feature of the one or more moving targets and the feature of the road on which the terminal device is located, the type of the road on which the terminal device is located. The movement feature may be one or more of a movement speed of the one or more moving objects and a slope of a movement track of the one or more moving objects.

In some possible implementations, the feature of the road on which the terminal device is located further includes a quantity of lanes of the road on which the terminal device is located. The determining, based on the feature of the road on which the terminal device is located, a type of the road on which the terminal device is located includes determining, based on the quantity of lanes of the road on which the terminal device is located, whether the terminal device enters or leaves the intersection of the elevated road, and if the terminal device enters or leaves the intersection of the elevated road, determining that the type of the road on which the terminal device is located is the elevated road. A course angle is an included angle between a speed and the north pole of the earth. The quantity of lanes of the road on which the terminal device is located may be calculated based on a lane width and a distance between two road edges of the road on which the sensor and the terminal device are located.

In some possible implementations, the selecting the target road from the plurality of roads based on the type of the road on which the terminal device is located and the types of the plurality of roads includes calculating a matching degree between each of the plurality of roads and the coordinates of the terminal device. A matching degree of a road that is in the plurality of roads and that has a same type as the road on which the terminal device is located is greater than a matching degree of a road that is in the plurality of roads and that has a different type from the road on which the terminal device is located. The target road is a road that is in the plurality of roads and that has a highest degree of matching with the coordinates of the terminal device.

In some possible implementations, the determining, based on the feature of the road on which the terminal device is located, a type of the road on which the terminal device is located includes, if the feature of the road on which the terminal device is located is less than a first threshold, determining that the type of the intersection at which the terminal device is located is the intersection of the elevated road. The feature of the road on which the terminal device is located may be a plurality of features, and each feature has a first threshold corresponding to the feature.

In some possible implementations, the determining, based on the feature of the road on which the terminal device is located, a type of the road on which the terminal device is located includes, if the feature of the road on which the terminal device is located is greater than a second threshold, determining that the type of the intersection at which the terminal device is located is the intersection of the non-elevated road.

In some possible implementations, the road divider of the road on which the terminal device is located includes a first road divider and a second road divider. The determining, based on the feature of the road on which the terminal device is located, a type of the road on which the terminal device is located includes, if a difference between a feature that is of the road on which the terminal device is located and that corresponds to the first road divider and a feature that is of the road on which the terminal device is located and that corresponds to the second road divider is greater than a third threshold, determining that the type of the road on which the terminal device is located is the elevated road.

In some possible implementations, the movement feature of the one or more moving objects is the movement speed of the one or more moving objects. The determining, based on movement feature of the one or more moving objects, a type of the road on which the terminal device is located includes, if the movement speed of the one or more moving objects is greater than a fourth threshold, determining that the type of the intersection at which the terminal device is located is the intersection of the non-elevated road.

In some possible implementations, the movement feature of the one or more moving targets is the slope of the movement track of the one or more moving targets. The determining, based on the movement feature of the one or more moving targets, the type of the intersection at which the terminal device is located includes, if the slope of the movement track of the one or more moving targets is less than a fifth threshold, determining that the intersection at which the terminal device is located is the intersection of the non-elevated road.

In some possible implementations, the feature of each of the plurality of candidate roads includes a quantity of lanes of each of the plurality of candidate roads. The determining, based on the quantity of lanes of the road on which the terminal device is located, whether the terminal device enters or leaves the intersection of the elevated road includes, if the quantity of lanes of the road on which the terminal device is located is greater than the quantity of lanes of each of the plurality of candidate roads, determining that the type of the road on which the terminal device is located is the elevated road. The quantity of lanes that is of each of the plurality of candidate roads and that is recorded in the map data does not include a ramp. In a ramp intersection region on the elevated road, it is assumed that an actual quantity of lanes of the road is 5, and the quantity of lanes that is of the road and that is recorded in the map data is 4. Therefore, the quantity of lanes of the road on which the terminal device is located is calculated based on the data collected by the sensor. If the calculated quantity of lanes on the road on which the terminal device is located is greater than the quantity of lanes of each of the plurality of candidate roads, it may be determined that the terminal device is located on the elevated road.

In some possible implementations, the determining, based on the quantity of lanes of the road on which the terminal device is located, whether the terminal device enters or leaves the intersection of the elevated road includes, obtaining course angles of the terminal device at a plurality of moments, and if a variance of the course angles of the terminal device at the plurality of moments is greater than a sixth threshold, determining, based on the quantity of lanes of the road on which the terminal device is located, whether the terminal device enters or leaves the intersection of the elevated road.

According to a second aspect, an embodiment of this application provides an electronic device. The electronic device includes an obtaining module, a feature calculation module, a selection module, and a road matching module.

The obtaining module is configured to obtain coordinates of a terminal device, data of a plurality of collection points of a road divider, and features of a plurality of candidate roads. The plurality of candidate roads are roads that are in map data and that are located in a first range of the coordinates of the terminal device. The road divider is an edge of a road on which the terminal device is located, and the plurality of collection points of the road divider are collection points obtained when a sensor collects the road divider.

The feature calculation module is configured to calculate, based on the data of the plurality of collection points of the road divider, a feature of the road on which the terminal device is located. The feature of the road on which the terminal device is located is used to indicate a change in a shape of the road on which the terminal device is located.

The selection module is configured to select a target road from the plurality of candidate roads based on the feature of the road on which the terminal device is located and the features of the plurality of candidate roads.

The road matching module is configured to match the coordinates of the terminal device to the target road, to obtain corrected coordinates of the terminal device.

In some possible implementations, the selection module is further configured to determine, based on the feature of the road on which the terminal device is located, a type of the road on which the terminal device is located, and select the target road from the plurality of candidate roads based on the type of the road on which the terminal device is located and types of the plurality of candidate roads.

In some possible implementations, the selection module is further configured to determine, based on the feature of the road on which the terminal device is located, a type of an intersection at which the terminal device is located. The type of the intersection is an intersection of an elevated road or an intersection of a non-elevated road, and the intersection at which the terminal device is located is an intersection at which the terminal device is currently located.

In some possible implementations, the selection module is further configured to, if the feature of the road on which the terminal device is located meets a preset threshold, determine the type of the intersection at which the terminal device is located. The type of the intersection is the intersection of the elevated road or the intersection of the non-elevated road.

In some possible implementations, the obtaining module is further configured to obtain coordinates that are of one or more moving objects and that are collected by the sensor. The coordinates of the moving object are coordinates of the moving object relative to the sensor.

The feature calculation module is further configured to calculate a movement feature of the one or more moving targets based on the coordinates of the one or more moving targets, where the movement feature is used to indicate a movement state of the moving target.

The selection module is further configured to determine, based on the movement feature of the one or more moving targets and the feature of the road on which the terminal device is located, the type of the road on which the terminal device is located.

In some possible implementations, the feature of the road on which the terminal device is located further includes a quantity of lanes of the road on which the terminal device is located. The selection module is further configured to determine, based on the quantity of lanes of the road on which the terminal device is located, whether the terminal device enters or leaves the intersection of the elevated road, and if the terminal device enters or leaves the intersection of the elevated road, determine that the type of the road on which the terminal device is located is the elevated road.

In some possible implementations, the selection module is further configured to calculate a matching degree between each of the plurality of roads and the coordinates of the terminal device. A matching degree of a road that is in the plurality of roads and that has a same type as the road on which the terminal device is located is greater than a matching degree of a road that is in the plurality of roads and that has a different type from the road on which the terminal device is located. The target road is a road that is in the plurality of roads and that has a highest degree of matching with the coordinates of the terminal device.

In some possible implementations, the selection module is further configured to, if the feature of the road on which the terminal device is located is less than a first threshold, determine that the type of the intersection at which the terminal device is located is the intersection of the elevated road.

In some possible implementations, the selection module is further configured to, if the feature of the road on which the terminal device is located is greater than a second threshold, determine that the type of the intersection at which the terminal device is located is the intersection of the non-elevated road.

In some possible implementations, the movement feature of the one or more moving targets is a movement speed of the one or more moving targets. The selection module is further configured to, if the movement speed of the one or more moving targets is greater than a fourth threshold, determine that the type of the intersection at which the terminal device is located is the intersection of the non-elevated road.

In some possible implementations, the movement feature of the one or more moving targets is a slope of a movement track of the one or more moving targets. The selection module is further configured to, if the slope of the movement track of the one or more moving targets is less than a fifth threshold, determine that the intersection at which the terminal device is located is the intersection of the non-elevated road.

In some possible implementations, the feature of each of the plurality of candidate roads includes a quantity of lanes of each of the plurality of candidate roads. The selection module is further configured to, if the quantity of lanes of the road on which the terminal device is located is greater than the quantity of lanes of each of the plurality of candidate roads, determine that the type of the road on which the terminal device is located is the elevated road.

In some possible implementations, the obtaining module is further configured to obtain course angles of the terminal device at a plurality of moments. The selection module is further configured to, if a variance of the course angles of the terminal device at the plurality of moments is greater than a sixth threshold, determine, based on the quantity of lanes of the road on which the terminal device is located, whether the terminal device enters or leaves the intersection of the elevated road.

According to a third aspect, an embodiment of this application provides an electronic device. The electronic device includes a sensor, a processor, and a computer-readable storage medium storing a computer program. The sensor is configured to collect data of a road divider and coordinates of one or more moving targets. The processor is coupled to the computer-readable storage medium. When the processor executes the computer program, the positioning method provided in any one of the first aspect and the possible implementations of the first aspect is implemented.

According to a fourth aspect, an embodiment of this application provides a computer-readable storage medium. The computer-readable storage medium stores a computer program, and when a processor executes the computer program, the positioning method provided in any one of the first aspect and the possible implementations of the first aspect is implemented.

According to a fifth aspect, an embodiment of this application provides a chip subsystem (SOC). The chip subsystem includes an application processor and a GPS module configured to receive a positioning signal, and the application processor is configured to implement the positioning method provided in any one of the first aspect and the possible implementations of the first aspect.

According to a sixth aspect, an embodiment of this application provides an electronic device. The electronic device includes the chip subsystem provided in the fifth aspect and a sensor such that the electronic device can implement the positioning method provided in any one of the first aspect and the possible implementations of the first aspect. The sensor is configured to collect data of a road divider and coordinates of one or more moving targets.

According to a seventh aspect, an embodiment of this application provides a positioning chip. The positioning chip includes a radio frequency module and a processing module. The radio frequency module is configured to receive a positioning signal, and the processing module is configured to implement the positioning method provided in any one of the first aspect and the possible implementations of the first aspect.

According to an eighth aspect, an embodiment of this application provides an electronic device. The electronic device includes the positioning chip provided in the seventh aspect and a sensor such that the electronic device can implement the positioning method provided in any one of the first aspect and the possible implementations of the first aspect. The sensor is configured to collect data of a road divider and coordinates of one or more moving objects.

According to a ninth aspect, an embodiment of this application provides a computer program product. The computer program product includes a computer program, and when a processor executes the computer program, the positioning method provided in any one of the first aspect and the possible implementations is implemented.

DESCRIPTION OF EMBODIMENTS

Some key terms in this application are explained below:

Global positioning system (GPS) refers to an omnidirectional, round-the-clock, full-time, and high-precision satellite navigation system developed by the United States Department of Defense, can provide global users with low-cost and high-precision navigation information such as three-dimensional locations, speeds, and precise timing, and is a typical application of satellite communications technologies in the navigation field.

The global navigation satellite system (GNSS) refers to all satellite navigation systems including global, regional, and enhanced satellite navigation systems, for example, the GPS in the United States, the GLONASS in Russia, the Galileo in Europe, the BEIDOU satellite navigation system in China, and related enhanced systems such as the wide region augmentation system in the United States, the European geostationary navigation overlay service, and the multi-functional satellite augmentation system in Japan. The global navigation satellite system further includes other satellite navigation systems under construction and to be constructed in the future. The international GNSS system is a multi-system, multi-layer, multi-mode complex combination system.

A vehicle navigation system (VNS) is an intelligent traffic system that integrates a vehicle positioning technology such as the GNSS, a geographic information system, and a computer technology.

Road stacking refers to a structure in which roads located at different spatial layers are roughly parallel in a horizontal direction, and road surfaces overlap in a vertical direction.

An elevated road usually refers to an urban space road that is 6 meters (m) above the ground. Generally, the elevated road and a common road on the ground constitute a multi-layer road system.

A millimeter-wave radar is a radar that works in a millimeter wave band for detection. Generally, a millimeter wave refers to an electromagnetic wave in a frequency domain of 30 gigahertz (GHz) to 300 GHz (with a wavelength between 1 millimeters (mm) and 10 mm). The wavelength of the millimeter wave is between a wavelength of a microwave and a wavelength of a centimeter wave. Therefore, the millimeter-wave radar has some advantages of both a microwave radar and a photoelectric radar.

Inertial measurement unit (IMU) is a triaxial gyroscope and a triaxial accelerometer are mounted in one IMU, to measure angular speeds and accelerations of an object in three-dimensional space, and calculate a posture of the object based on the angular speeds and the accelerations. To improve reliability, each axis may further be equipped with more sensors. Generally, the IMU needs to be mounted on the center of gravity of a to-be-measured object.

Figure 9:
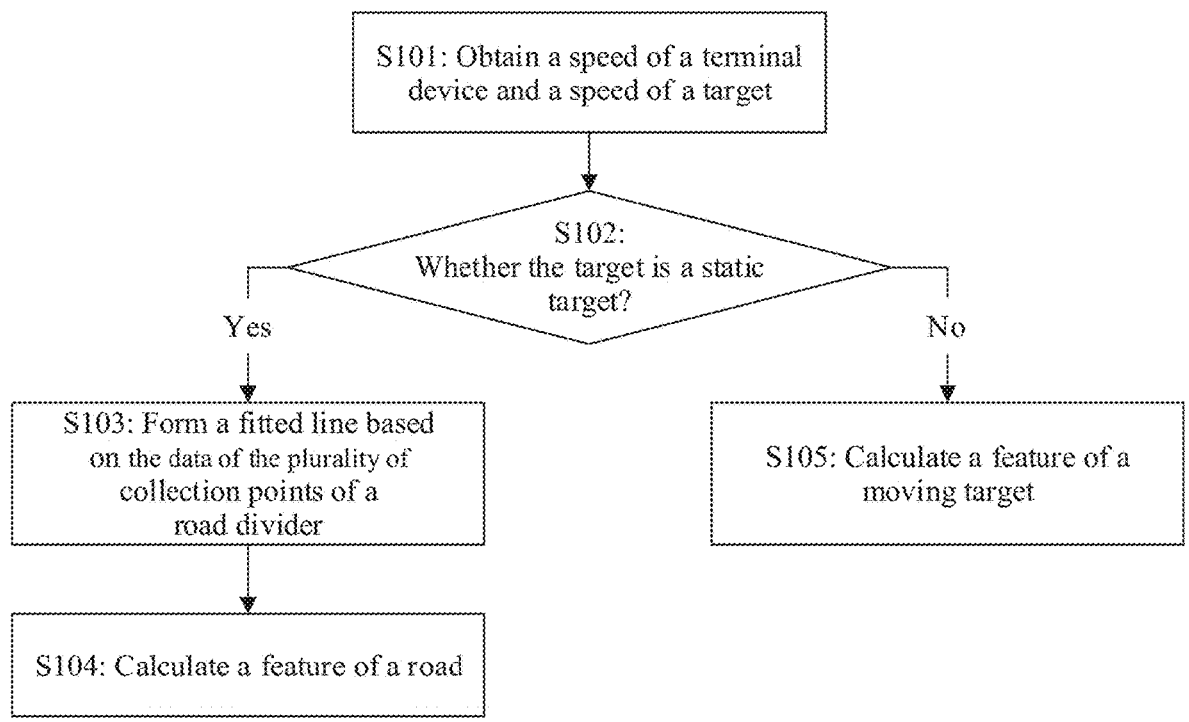
FIG. 9 is a flowchart of a positioning method according to an embodiment of the present disclosure.

A vehicle body coordinate system is shown in FIG. 9. An origin of the vehicle body coordinate system is defined as a projected point of a center of a rear axle of a vehicle on the horizontal ground, and the rear axle of the vehicle is an axle between two rear wheels of the vehicle. An X axis (referred to as Veh_X axis) in the vehicle body coordinate system is a positive direction of a vehicle head, namely, the front of the vehicle. A Y axis (referred to as a Veh_Y axis) of the vehicle body coordinate system is obtained by rotating 90 degrees anticlockwise along the Veh_X axis.

Figure 1:
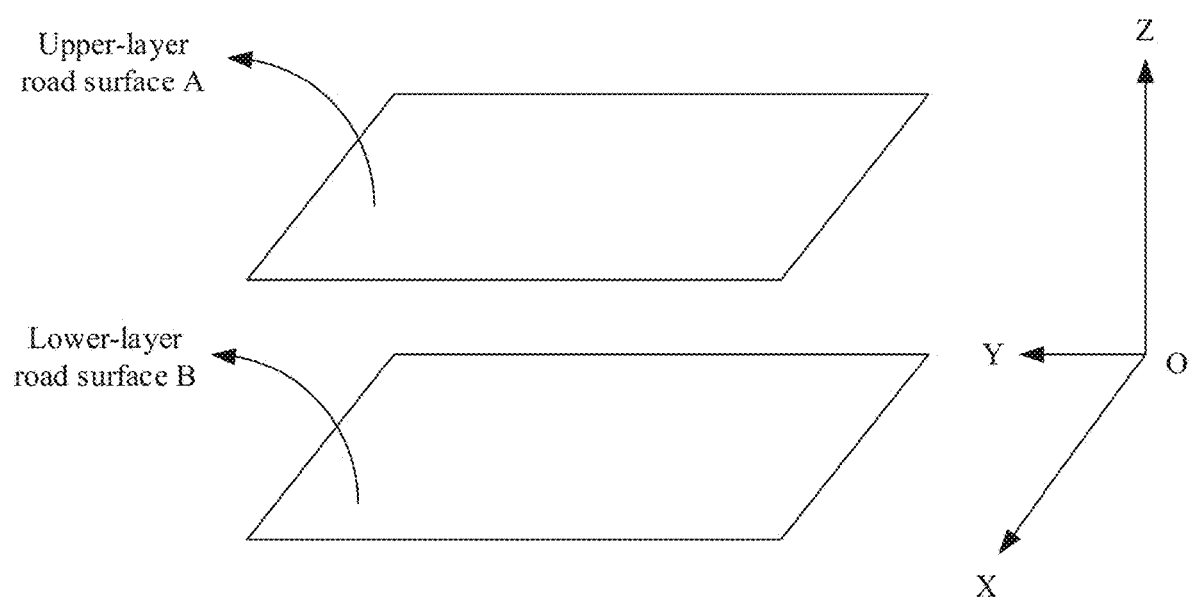
FIG. 1 is a schematic diagram of road stacking according to an embodiment of the present disclosure.
Figure 2:
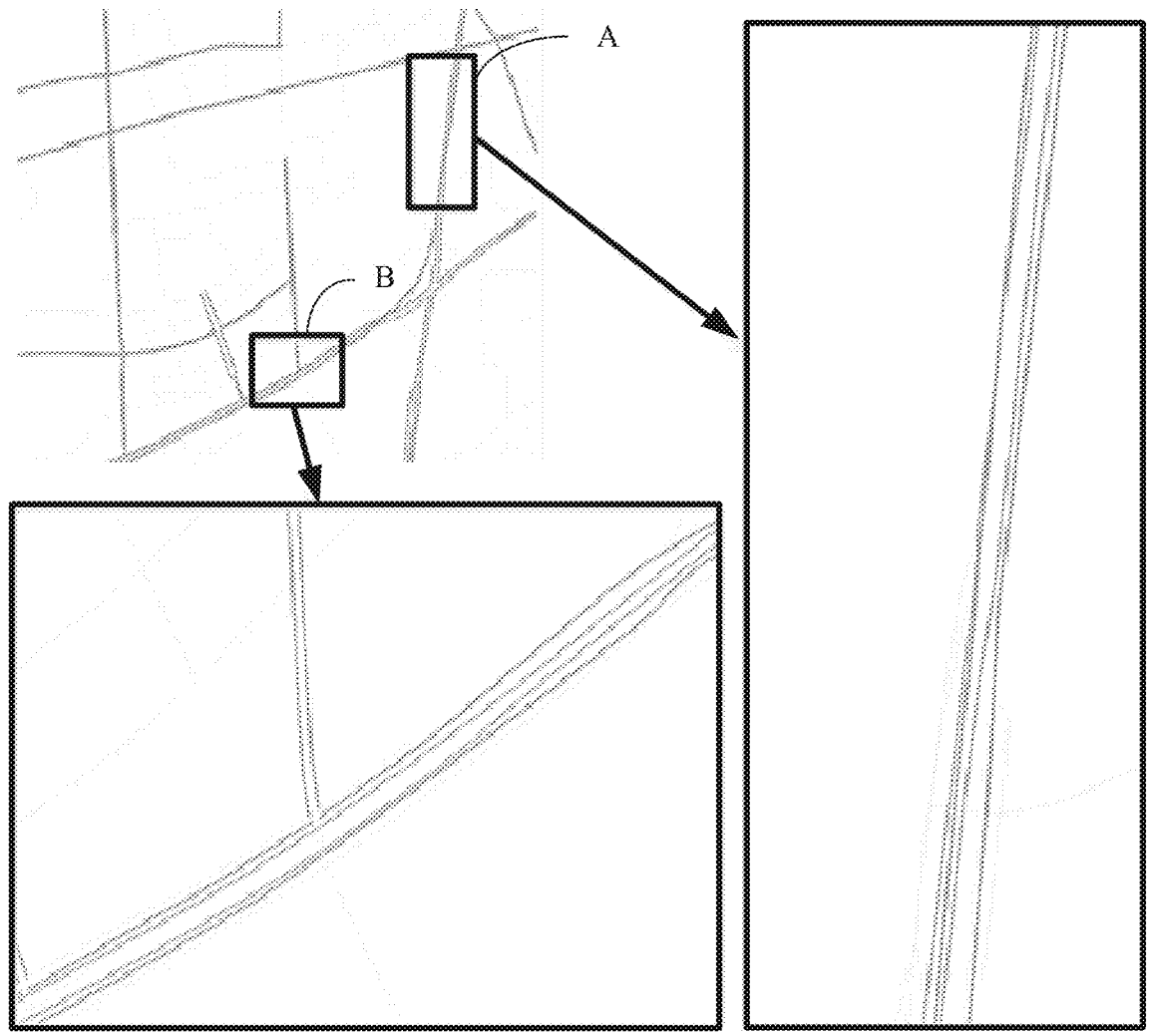
FIG. 2 is a schematic road diagram of an electronic map according to an embodiment of the present disclosure.
Figure 3:
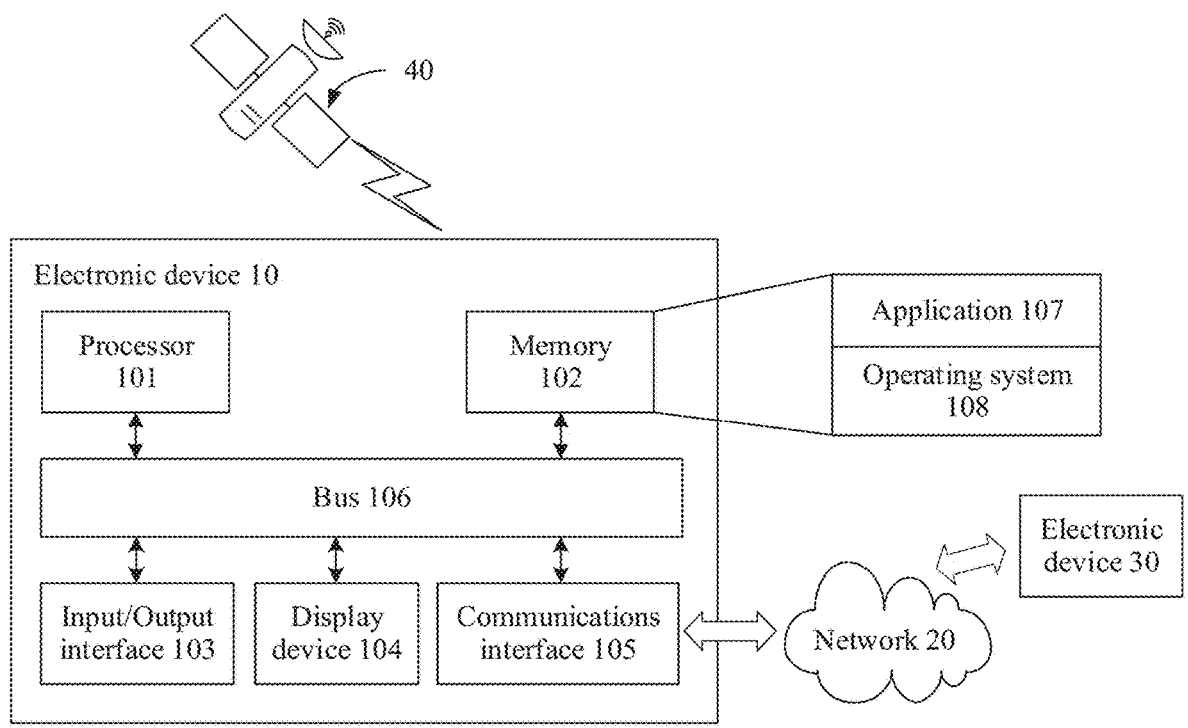
FIG. 3 is a schematic structural diagram of a communications system according to an embodiment of the present disclosure.

FIG. 3 is a communications system to which this application is applicable. It should be noted that the system in FIG. 3 is merely an example of a possible system, and a disclosed implementation solution may be implemented in any one of various systems based on a requirement.

As shown in FIG. 3, the system includes an electronic device 10, and may further include a network 20, an electronic device 30, and a satellite 40.

The electronic device 10 may receive a radio signal from the satellite 40. The electronic device 10 may perform multi-source fusion positioning, and perform positioning by combining one or more positioning signals such as a satellite positioning signal, an inertial navigation signal, a network positioning signal, and a positioning signal of a sensor, for example, a laser or a radar. The electronic device 10 and the electronic device 30 may be communicatively connected through the network 20, where the network 20 may be a wireless local area network or a mobile network. A communication connection is established between the electronic device 10 and the electronic device 30 based on a specific communications protocol, and then data is transmitted in a unit of a data packet based on the established connection. In a transmission process, a data packet may pass through one or more network devices in the network 20, for example, an access network device, a routing device, or an access point (AP).

The electronic device 10 may be a terminal device, and may be any one of various types of computer systems or devices that are mobile or portable and that perform wireless communication. For example, the electronic device 10 may include a mobile phone or a smartphone (for example, an iPhone™-based or Android™-based phone), a vehicle-mounted terminal device, a portable game device (for example, Nintendo DS™, PlayStation Portable™, Gameboy Advance™ or the iPhone™), a laptop computer, a personal digital assistant (PDA), a portable internet device, a music player, a data storage device, another handheld device, and a wearable device, for example, a wristwatch, a headset, a pendant, or an earpiece. The electronic device 30 may be a terminal device or a server, and may be a cloud server, a proxy server, or another server communicatively connected to a proxy server. In this embodiment provided in the present disclosure, the electronic device 30 may be a cloud server that provides full road network data, and the electronic device 10 may request to download and update map data from the cloud server 30 through the network 20. A person skilled in the art may understand that one communications system may usually include fewer or more components than components shown in FIG. 3, or include a component different from the components shown in FIG. 3. FIG. 3 merely shows the components more related to a plurality of implementations disclosed in this embodiment of this application.

The electronic device 10 includes components such as a processor 101, a memory 102, an input/output interface 103, and a communications interface 105. A person skilled in the art may understand that the electronic device 10 may include more or fewer components than those shown in the figure, or combine some components.

These components may perform communication through one or more buses 106 or signal lines. The bus may be classified into an address bus, a data bus, a control bus, and the like. The processor 101 may be a central processing unit (CPU), a network processor (NP), or a combination of a CPU and an NP. The processor 101 may further include a hardware chip. The hardware chip may be an application-specific integrated circuit (ASIC), a programmable logic device (PLD), or a combination of an application-specific integrated circuit and a programmable logic device. The PLD may be a complex programmable logic device (CPLD), a field-programmable gate array (FPGA), generic array logic (GAL), or any combination thereof. Optionally, the processor 101 may include one or more processing units.

The memory 102 is configured to store computer programs, such as an application 107 and an operating system 108 that are shown in FIG. 3. The processor 101 may invoke the computer program stored in the memory 102, to implement a function defined by the computer program. For example, the processor 101 executes the operating system 108, to implement various functions of the operating system on the electronic device 10. The operating system 108 may be Linux®, Windows®, iOS®, Android®, or another operating system. This is not limited in this embodiment of this application.

The memory 102 further stores other data in addition to the computer programs, for example, data generated during running of the operating system 108 and the application 107. The memory 102 may include a volatile memory, for example, a random-access memory (RAM). The memory 102 may alternatively include a non-volatile memory, for example, a flash memory, a hard disk drive (HDD), or a solid-state drive (SSD). The memory 102 may further include a combination of the foregoing types of memories. FIG. 3 shows only one memory. Certainly, the memory 102 may alternatively be replaced by a plurality of storage devices based on a requirement. The memory 102 may be alternatively a memory in the processor 101. This is not limited herein.

The input/output interface 103 forwards a command or data that is input using an input/output device (for example, a keyboard, a touchscreen, and a sensor). The sensor may include one or more of sensors such as the radar, an inertial measurement unit, and the laser.

A display device 104 displays various types of information to a user. In this embodiment of the present disclosure, a final positioning result, namely, a road on which the electronic device 10 is located and a location of the electronic device 10, is displayed on an interface of a positioning application.

The communications interface 105 is hardware configured to connect the electronic device 10 to another electronic device, and allow the electronic device 10 to communicate on a network. For example, the communications interface may be connected to the network in a wired or wireless manner to connect to another external terminal or server. The wireless communication may use any communications standard or protocol, including but not limited to GPS, Global System for Mobile Communications (GSM), general packet radio service (GPRS), code-division multiple access (CDMA), wideband code division multiple access (WCDMA), Long-Term Evolution (LTE), email, short messaging service (SMS), Wi-Fi, Bluetooth (BT), near-field communication (NFC), and the like. In a terminal device, the communications interface 105 may be a modem, an antenna, a Wi-Fi module, or a GPS module. The communications interface 105 may alternatively be integrated with a processor and a memory (including a RAM and a read-only memory (ROM)).

Figure 4A:
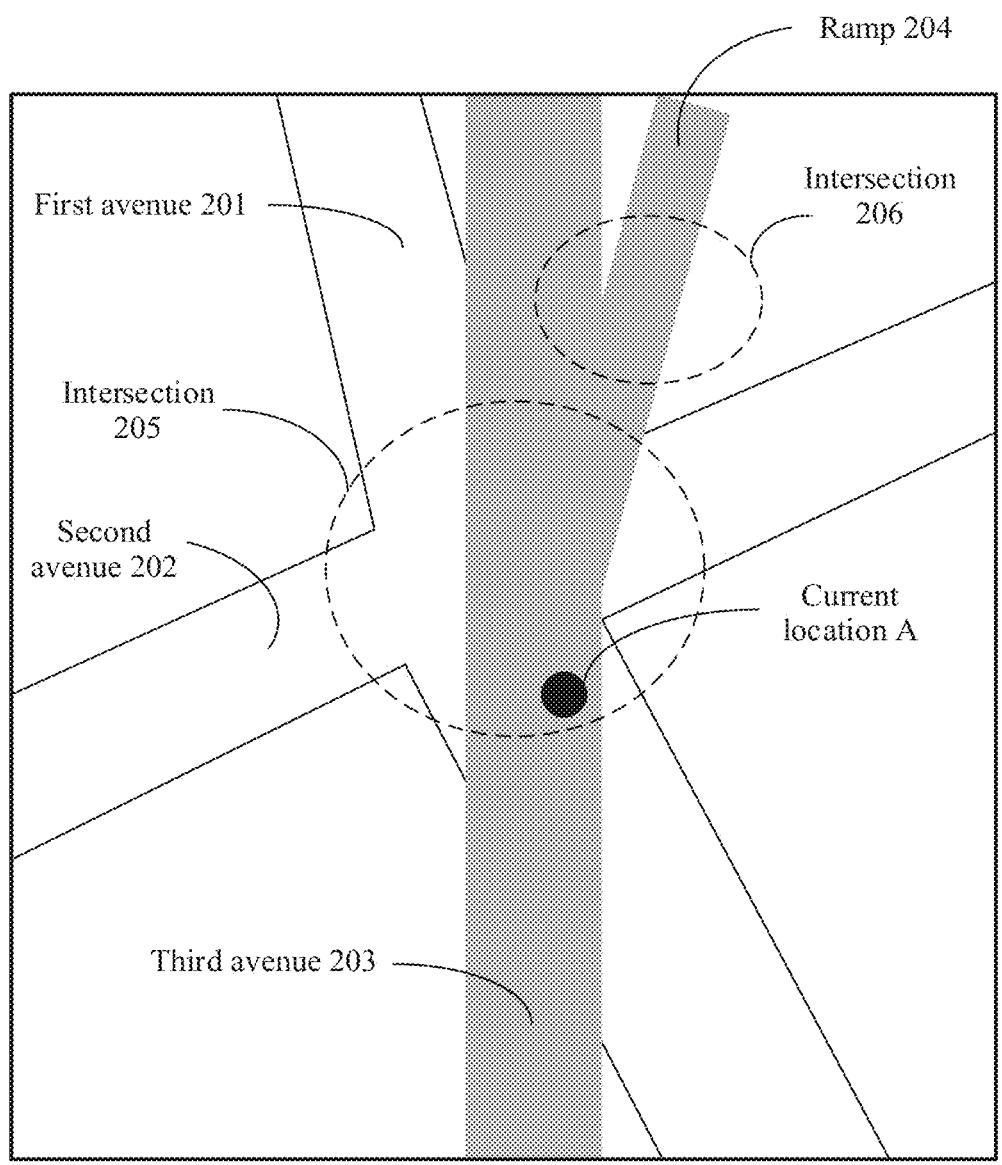
FIG. 4A is a schematic road diagram of an elevated region according to an embodiment of the present disclosure.
Figure 4B:
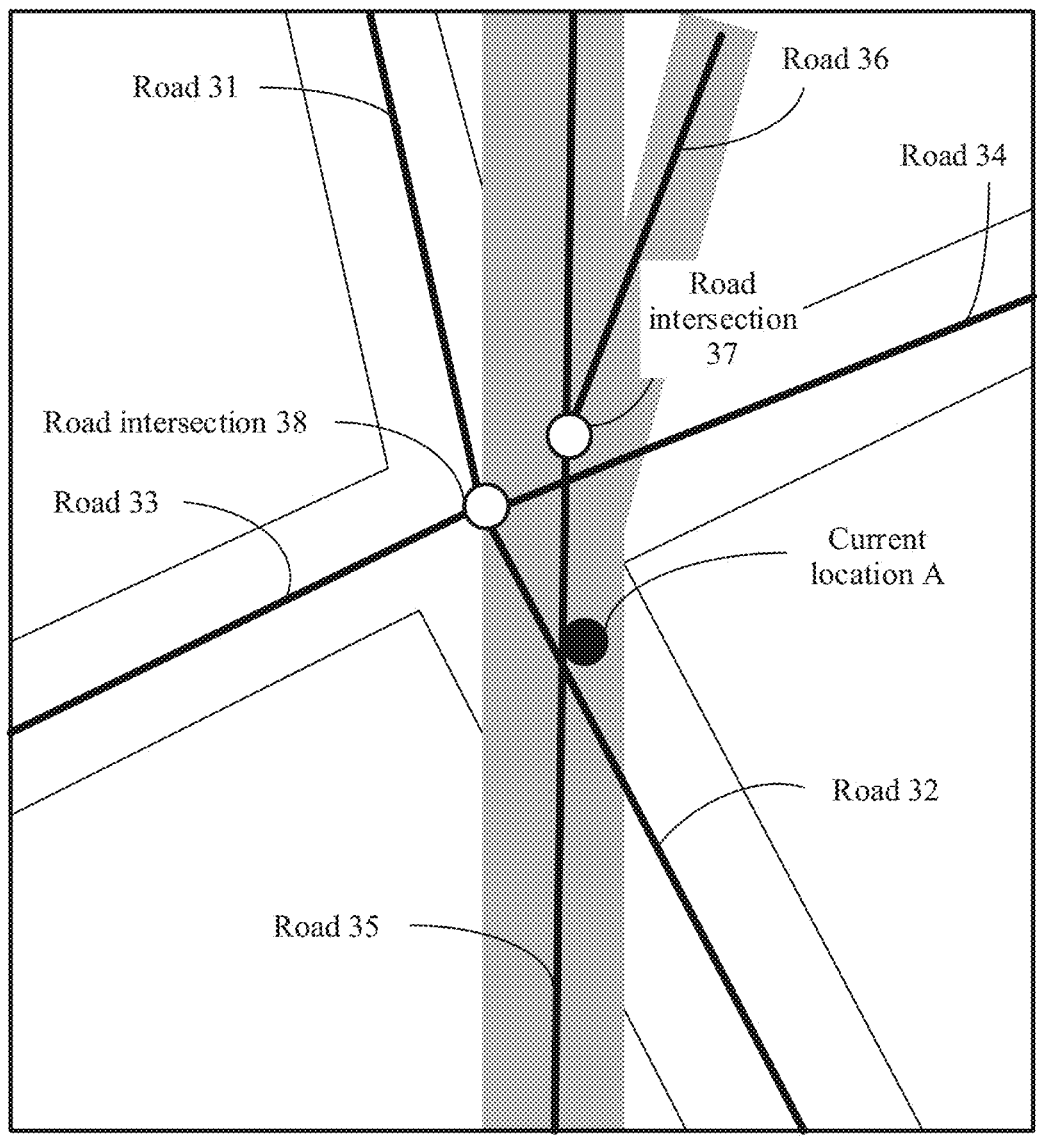
FIG. 4B is a schematic diagram of an electronic map of an elevated region according to an embodiment of the present disclosure.

An example in which the electronic device is a vehicle-mounted terminal is used. The vehicle-mounted terminal calculates original location coordinates based on a positioning signal. Because the original location coordinates are usually inaccurate, map matching needs to be performed between the original location coordinates and a road near the original location coordinates, to correct the original location coordinates. When performing map matching based on the original location coordinates, the vehicle-mounted terminal needs to search the map data for roads located in a specific distance of the original location coordinates as candidate roads, selects, from the candidate roads, a road matching the original location coordinates, and may display information about the road on a display screen of the vehicle-mounted terminal, to display a road on which the user is currently located for the user. The map data records information about roads and intersections in a specific region, and may further record some points of interest (point of interest, POI), for example, landmarks or scenic spots in the region. The map data is in a scenario of road stacking shown in FIG. 4A. In a region shown in FIG. 4A, a location at which the vehicle-mounted terminal is actually located is a current location A, and a first avenue 201 and a second avenue 202 intersect at an intersection 205. Both the first avenue 201 and the second avenue 202 are located on a horizontal ground below an elevated road, and are non-elevated roads. A third avenue 203 and a ramp 204 intersect at an intersection 206, are located above the elevated road, and are elevated roads. In the map data, a schematic diagram of a road network corresponding to FIG. 4A is shown in FIG. 4B. Roads 31 to 36 are used to indicate real roads, and road intersections 37 and 38 are used to indicate intersections and indicate a connection relationship between road lines. The roads and the road intersections constitute a road network topology. In the map data, the first avenue 201 is abstracted as the road 31 and the road 32, the second avenue 202 is abstracted as the road 33 and the road 34, the third avenue 203 is abstracted as the road 35, and the ramp 204 is abstracted as the road 36. The intersections 205 and 206 are respectively abstracted as the road intersections 38 and 37. A type of each road may be recorded in the map data. For example, a type of the road 31 is recorded as a non-elevated road, and a type of the road 35 is recorded as an elevated road. One or more of a road name of a road line (for example, a name of the road 301 is the first avenue), a number of the road line, coordinates of a start point and coordinates of an end point of the road line, and coordinates of a road intersection may be further recorded. If the roads 31 to 36 are matchable candidate roads, when map matching is performed, it is difficult to accurately determine a road line in which the vehicle-mounted terminal is actually located. Therefore, a misjudgment occurs. For example, the vehicle-mounted terminal is actually located at the current location A on the third avenue 203. However, a target road selected from the candidate roads 31 to 36 according to an existing map matching method is the road 32, and the current location displayed by the vehicle-mounted terminal to the user based on a target road line reflects that the vehicle-mounted terminal is on the first avenue 201. Therefore, in the road stacking scenario, a positioning result is inaccurate, and user experience is reduced. An existing method for determining whether a current road is an elevated road is mainly to determine whether the current road is the elevated road by identifying uphill and downhill actions. For example, the uphill and downhill actions are identified by using a change in tire pressure of rear wheels of a vehicle and a vehicle inclination degree. However, a scenario in which the uphill and downhill actions are not included in a traveling process cannot be processed. For example, after the vehicle-mounted terminal is restarted on the elevated road, whether a current road is an elevated road cannot be determined, until a next uphill action location and a next downhill action location appear. Therefore, real-time performance is insufficient.

According to a positioning method provided in embodiments of this application, upper and lower intersections of an elevated road or actions of entering or leaving an intersection are identified based on a road feature and a feature of a surrounding vehicle that are collected by a radar, to distinguish whether a type of a road on which a vehicle is currently located is an elevated road or a non-elevated road. This can achieve round-the-clock road matching.

Figure 5:
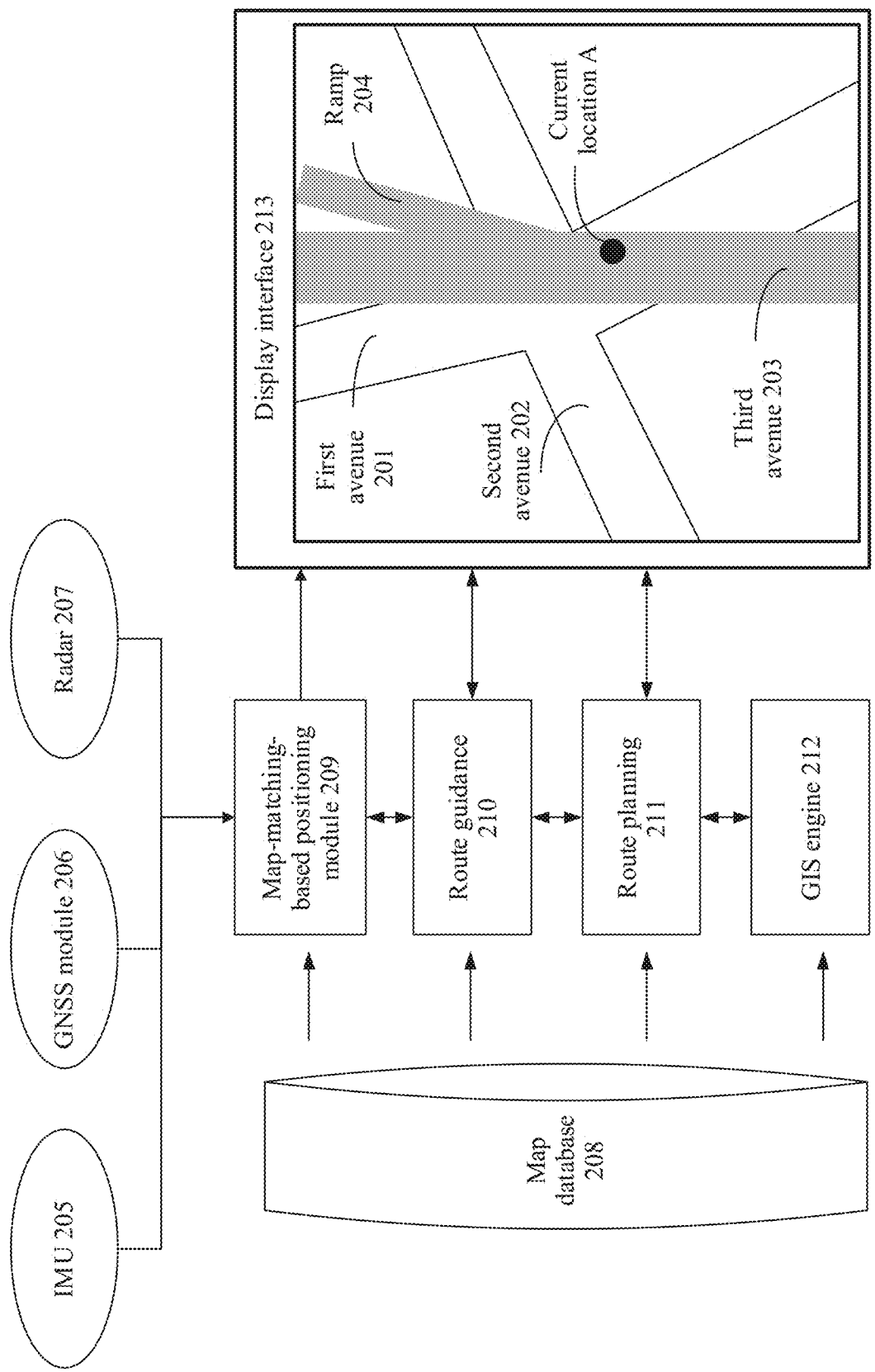
FIG. 5 is a schematic structural diagram of a positioning system according to an embodiment of the present disclosure.

FIG. 5 is a schematic structural diagram of a positioning system according to an embodiment of this application. The positioning system may be the foregoing electronic device 10. Specifically, the positioning system may be a vehicle navigation system. The positioning system includes an inertial measurement unit IMU 205, a GNSS module 206 (or referred to as a GPS module), and a radar 207, and further includes a map-matching-based positioning module 209, a route guidance 210, a route planning 211, a map database 208, a GIS engine 212, and a display interface 213.

The radar 207 may be specifically a millimeter-wave radar. The radar 207 may be configured to collect an object around a vehicle within a collection range of the radar. The object may specifically include a static object around the vehicle (an ego vehicle), for example, a road divider, and moving objects around the vehicle, such as a moving vehicle and a moving pedestrian. The road divider is an edge of a road, and is used to distinguish two roads. Specifically, the road divider may be a cement pier, a tree, a guardrail, a road edge, or the like. The IMU 205 is configured to measure a course angle of the vehicle (the ego vehicle). The GNSS module 206 is configured to calculate coordinates of a current location of the vehicle (the ego vehicle) based on a received positioning signal. Specifically, the coordinates may include longitude and latitude coordinates. The map database 208 stores data of roads in one or more countries, one or more cities, or a specific region, and may include one or more of coordinates of start points of the roads, coordinates of end points of the roads, coordinates of intersections, IDs of roads connected to the intersections, types of the roads, and a quantity of lanes of each of the roads. The map database 208 may be located in a memory, or may be located in a cloud server communicatively connected to a positioning apparatus, and may periodically request the cloud server to update the data.

The map-matching-based positioning module 209 may be configured to use the positioning method provided in the embodiments of this application. In a process of performing map matching based on map data provided by the map database 208, a type of a road on which the vehicle is currently located or a type of an intersection at which the vehicle is currently located may be identified based on data provided by the IMU 205, the GNSS module 206, and the radar 207, to determine, from a plurality of candidate roads, a target road matching the current location of the vehicle, and provide an ID of the target road and information about a road associated with the target road. The route guidance 210 queries and compares the map data using information such as a road identifier (ID) generated by the map-matching-based positioning module 209, to obtain a comparison result between the current location of the vehicle and an expected route provided by the route planning 211. The road on which the vehicle is currently located is presented using the display interface 213, and a location of the vehicle is more accurately reflected. For example, in the scenario in FIG. 4A, if it is determined that the type of the road on which the vehicle is currently located is an elevated road, the third avenue 203 is finally selected as a road that matches the original location coordinates, and the display interface 213 indicates that the current location A of the vehicle is on the third avenue 203. Further, the vehicle navigation system may further prompt, using a real-time voice, that the road on which the vehicle is currently located is the third avenue 203.

Figure 6:
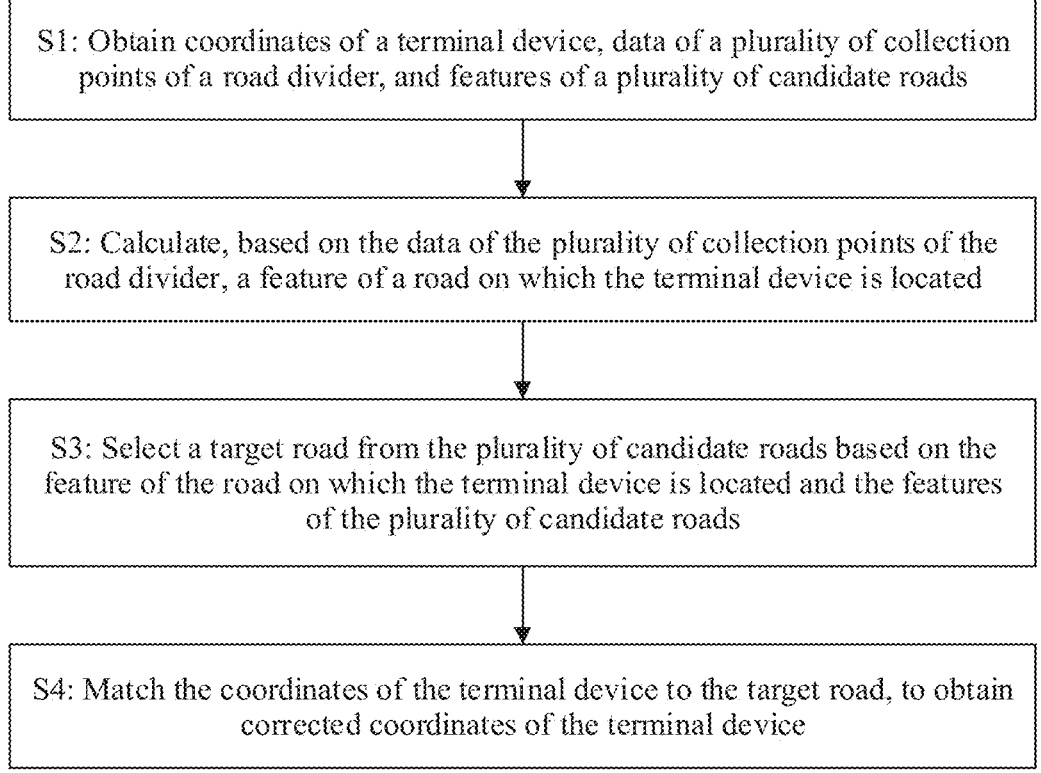
FIG. 6 is a flowchart of a positioning method according to an embodiment of the present disclosure.

The following describes in detail the positioning method provided in the embodiments of this application. A flowchart of the method is shown in FIG. 6, and the method includes the following steps.

S1: Obtain coordinates of a terminal device, data of a plurality of collection points of a road divider, and features of a plurality of candidate roads.

The obtained coordinates of the terminal device may be original coordinates that may be calculated by the terminal device based on a received positioning signal, and the original coordinates may have an error due to blocking, reflection, or the like of a building. Alternatively, the obtained coordinates of the terminal device may be coordinates calculated based on original coordinates calculated during previous positioning and a movement speed of the terminal device.

Based on the coordinates of the terminal device, roads located in a specific range of the coordinates of the terminal device may be searched for in map data. The roads may be roads located in a first range of the coordinates of the terminal device, and the first range may be an error range of the original coordinates. These roads may be candidate roads that may match the coordinates of the terminal device in a map matching phase. A circle may be made using the original coordinates as a center and using the first range as a radius. In the map data, roads that intersect the circle or are located in the circle are calculated as the candidate roads. A feature of the candidate road may be obtained from the map data. The map data may include a type of the road, and may further include one or more of coordinates of a start point of the road, coordinates of an end point of the road, an ID of the road, coordinates of a road intersection (or referred to as an intersection), and a connection relationship between roads. The type of the road may include an elevated road or a non-elevated road. The non-elevated road usually refers to a road on the ground, and is used to distinguish from the elevated road. The elevated road may include a ramp between the elevated road and the non-elevated road, and may further include a connection road between a plurality of elevated roads.

Figure 7:
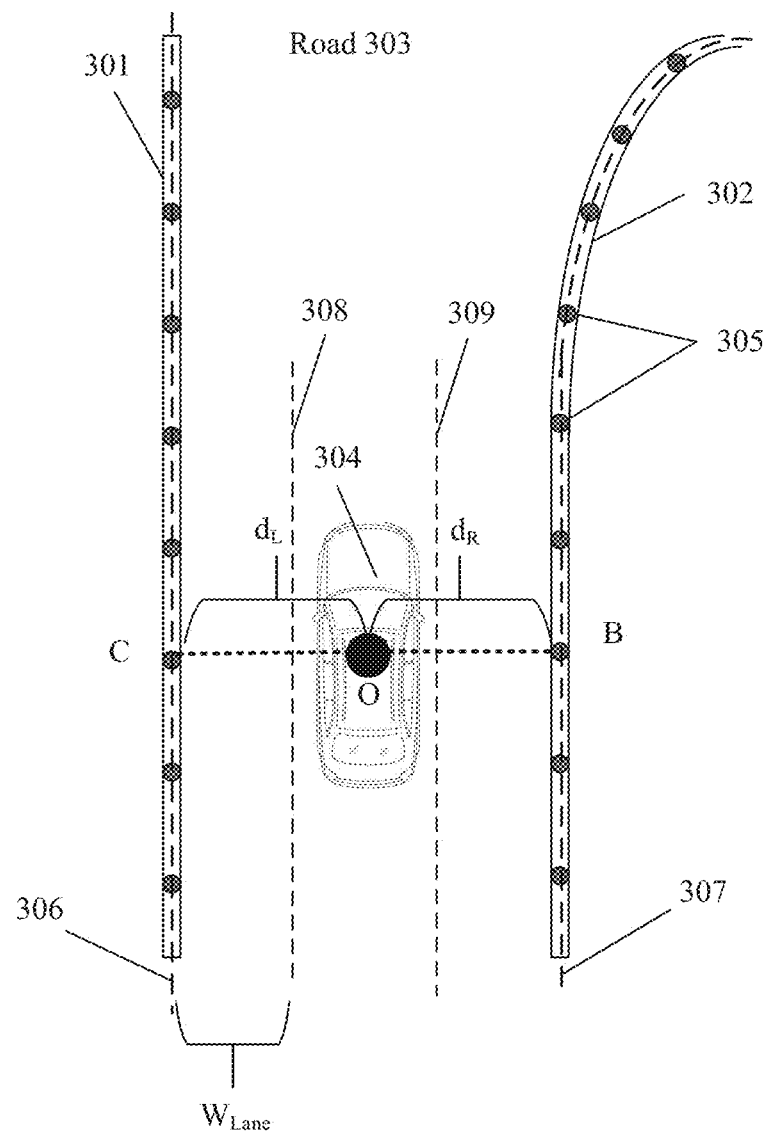
FIG. 7 is a schematic diagram of a road divider according to an embodiment of the present disclosure.

The terminal device may obtain, from a sensor, data that is collected by the sensor and that is of a static target and a moving target that are located in a specific distance of the terminal device. The sensor may be a radar, and may be a millimeter-wave radar. The static target may be a road divider, for example, a road edge or a railing that is located in the specific distance of the terminal device. The road divider is used to divide two roads and is an edge of a road. The moving target may be a pedestrian or a vehicle. As shown in FIG. 7, a vehicle 304 mounted with a sensor may detect, using the vehicle-mounted sensor, road dividers (for example, a road edge 301 and a road edge 302) of a road 303 on which the vehicle 304 is located. A plurality of collection points of the road divider are collection points obtained when the sensor collects the road divider, for example, a plurality of points 305 on the road edge 301 and the road edge 302 in FIG. 7. When identifying that an object at which the collection point is located is a static target or a moving target, the sensor may also calculate data of the collection point, for example, coordinates of the collection point.

Step S2: Calculate, based on data of the plurality of collection points of the road divider, a feature of a road on which the terminal device is located.

The feature of the road may be used to indicate a change in a shape of the road, and may be further used to indicate a total quantity of lanes of the road.

The road divider indicates the edge of the road and is used to distinguish any two roads. An example in which the road divider is the road edge is used. The plurality of collection points of the road divider may be a plurality of collection points on one road edge, or may be a plurality of collection points on each of two road edges constituting a road. The change in the shape of the road may be indicated by a change in a shape of the road edge, or may be indicated by a difference between changes in shapes of two road edges constituting a same road. The feature of the road may be obtained through calculation based on a distance between the terminal device and the road divider or a slope of the road divider. The feature of the road may alternatively be obtained through calculation based on a difference between distances of a plurality of road dividers constituting the road or a difference between slopes of the plurality of road dividers constituting the road.

Step S3: Select a target road from the plurality of candidate roads based on the feature of the road on which the terminal device is located and the features of the plurality of candidate roads.

Changes in shapes of the plurality of candidate roads are different to some extent. In other words, the candidate roads are distinguished using the features of the candidate roads. Therefore, the target road may be selected from the plurality of candidate roads based on a feature that is actually collected and calculated by the sensor and that is of the road on which the terminal device is located.

Optionally, a type of the road on which the terminal device is located is determined based on the feature of the road on which the terminal device is located. The target road is selected from the plurality of roads based on the type of the road on which the terminal device is located and types of the plurality of roads. The road on which the terminal device is located is a road on which the terminal device is currently located, and the type of the road may be the elevated road or the non-elevated road. The feature of the road on which the terminal device is located may reflect an actual change in a road edge of the road on which the terminal device is currently located. A type of a road on which the terminal device is actually located may be determined based on a value of the feature, to distinguish whether the road is an elevated road or a non-elevated road. For example, when the elevated road shown in FIG. 4B is stacked with a non-elevated road on the ground, a type of a road on which the current location A of the vehicle is located may be determined based on a feature of the road, and the target road is selected from the plurality of candidate roads (the roads 31 to 36).

Optionally, before step S3, the method may further include obtaining the types of the plurality of candidate roads. The types of the plurality of candidate roads may be obtained from the map data, and the map data may be data stored in a map database. The map data may include the type of the road, and the type of the road may be the elevated road or the non-elevated road.

In a possible implementation, a type of the selected target road is the same as the type that is of the road on which the terminal device is located and that is determined in the foregoing steps. In other words, the type of the road on which the terminal device is located may be compared with the types of the plurality of roads. A road whose type is the same as the type of the road on which the terminal device is located is selected from the plurality of roads and the road is used as the target road. For example, if only a type of a road A in five candidate roads is the same as the type of the road on which the terminal device is located, the road A may be selected as the target road.

In another possible implementation, a matching degree between each of the plurality of candidate roads and the terminal device may be calculated. The matching degree may be obtained through weighted calculation based on a plurality of influencing factors. A weighted value of each influencing factor may be set, and road type consistency may be one of the influencing factors. The road type consistency is used to indicate whether the type of the candidate road is the same as that of the road on which the terminal device is located. Three influencing factors A, B, and C are used as an example. k1 is a weight of the influencing factor A, k2 is a weight of the influencing factor B, and k3 is a weight of the influencing factor C. A formula for calculating a matching degree K is $K = A \times k1 + B \times k2 + C \times k3$. As shown in FIG. 4B, the roads 31 to 36 are all candidate roads, and types of the roads 31 to 36 are found in the map data. The types of the roads 31 to 34 are all non-elevated roads, and the types of the roads 35 and 36 are all elevated roads. If it is determined, in step S3, that the type of the road on which the terminal device is located is an elevated road, for the road type consistency, a score of road type consistency of the road 35 and the road 36 is greater than a score of road type consistency of the road 31 to the road 34.

Optionally, features of some or all of the plurality of candidate roads may be further obtained, where the features of the candidate roads may be features of the candidate roads calculated based on historical data collected by the sensor. Optionally, the feature of the candidate road may be collecting, in an offline state, data of a plurality of collection points of a road divider of each road in a specific region, calculating a road feature of each road, and using the road and the road feature corresponding to the road as a part stored in the map database. Optionally, a feature parameter of the candidate road may alternatively be, after the target road is determined according to steps Si to S3, a calculated feature parameter of the road on which the terminal device is located is used as a feature parameter corresponding to the target road, and is stored in the map database. In addition, the feature parameter corresponding to the target road may be further sent to a cloud server communicatively connected to the terminal device. A plurality of terminal devices communicatively connected to the cloud server may send, to the cloud server, the target road and a feature parameter that is of a road and that is collected by each of the plurality of terminal devices. The cloud server may correct the received data, and then send, to each of the plurality of terminal devices, each of the plurality of roads and a feature parameter corresponding to the road, to update a correspondence that is between the road and the feature parameter and that is stored in the terminal device.

For example, in a case of a multi-way intersection, a multi-way intersection A is connected to roads 1 to 4, and geographical locations of the roads 2 to 4 are close. When the vehicle moves from the road 1 to the road 3 by crossing an intersection, because the geographical locations of the roads 2 to 4 are close, when the target road is selected from the candidate roads 2 to 4using, it may be shown that the vehicle is positioned on the road 2 or the road 4, but the vehicle is actually located on the road 3. Consequently, a relatively large positioning error and relatively poor user experience are caused. In this embodiment of this application, a feature parameter of a road on which the vehicle is actually located may be calculated based on data that is of the road divider and that is collected by the radar, and the target road is selected from the candidate roads 2 to 4 using the feature parameter of the road on which the vehicle is actually located.

Step S4: Match the coordinates of the terminal device to the target road, to obtain corrected coordinates of the terminal device.

Figure 8:
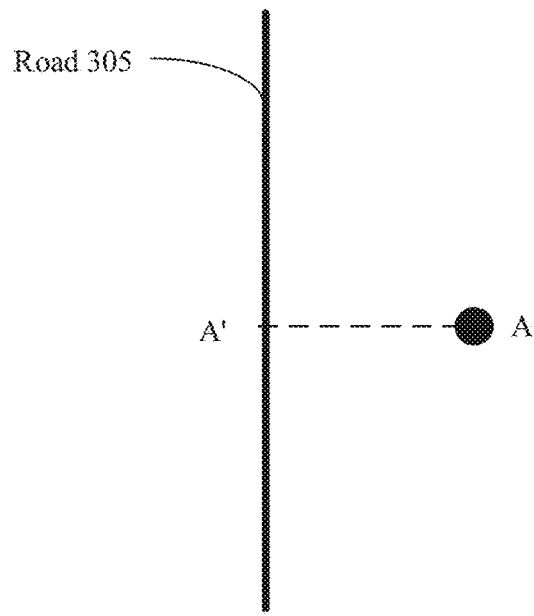
FIG. 8 is a schematic diagram of road matching according to an embodiment of the present disclosure.

During map matching, coordinates of a projected point of the original coordinates on the target road is usually used as corrected original coordinates. As shown in FIG. 8, a projected point of an original coordinate point A on a target road 305 is A'. A straight line equation of the road 305 is y=kx+b. coordinates $(x_0, y_0)$ of the point A, a method for calculating coordinates $(x_1, y_1)$ of the projected point A' is as follows, calculating the coordinates of the projected point A' of the point A, in other words, calculating a point at which a straight line that is perpendicular to a straight line of the road 305 and that crosses the point A $(x_0, y_0)$ intersects the road 305.

In another embodiment of this application, in the positioning method, the sensor needs to be used to identify a target around the terminal device, and collect data of the target. Whether a target in a specific range of the terminal device is a static target or a moving target may be identified. The static target may be a road divider, and the moving target may be a vehicle or a pedestrian. As shown in FIG. 9, the following steps are included.

Step S101: Obtain a speed of the terminal device and a speed that is of the target and that is detected by the sensor.

Figure 10:
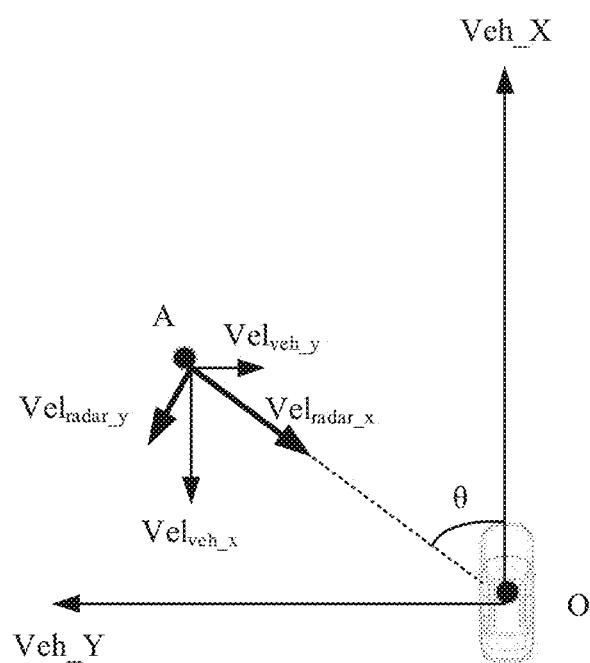
FIG. 10 is a schematic diagram of a vehicle body coordinate system according to an embodiment of the present disclosure.

The speed of the terminal device may be obtained through measurement using an IMU on the terminal device. The speed that is of the target and that is detected by the sensor may be obtained based on a change in coordinates that are of the target in a vehicle body coordinate system and that are detected by the sensor in a specific time period. An example in which the terminal device is a vehicle and the sensor is a millimeter-wave radar is used. The vehicle body coordinate system is shown in FIG. 10. An origin of the vehicle body coordinate system is defined as a projected point of a center of a rear axis of the vehicle on a horizontal ground, and the rear axis of the vehicle is an axle between two rear wheels of the vehicle. An X axis (referred to as a Veh_X axis) in the vehicle body coordinate system is a positive direction of a vehicle head, namely, the front of the vehicle. A Y axis (referred to as a Veh_Y axis) of the vehicle body coordinate system is obtained by rotating 90 degrees anticlockwise along the veh_X axis. A point A in FIG. 10 is a target detected by a vehicle O mounted with a millimeter-wave radar. Herein, a difference of a distance between the rear axis center of the vehicle and a location at which the radar is mounted on the vehicle is ignored. A speed of the vehicle O along the Veh_X axis is $Vel_x$, and a speed of the vehicle O along the Veh_Y axis is $Vel_y$. The millimeter-wave radar mounted on the vehicle O can detect that coordinates of a target A in the vehicle body coordinate system is $(X_{veh}, Y_{veh})$. Due to the principle of the Doppler effect, a speed (radial speed) that is of the target A in an AO direction and that is provided by the millimeter-wave radar is $Vel_{radar_x}$, a speed (tangential speed) in a direction of rotating the AO 90 degrees clockwise is $Vel_{radar_y}$, an AO distance is R, and an included angle between the AO and the Veh_X axis is θ. A speed $Vel_{veh\_x}$ of the target A in a Veh_X axis direction in the vehicle body coordinate system and a speed $Vel_{veh\_y}$ of the target A in a Veh_Y axis direction may be calculated according to the following formula:

$Vel_{veh\_x}=Vel_{radar\_x}*\cos(\theta)+Vel_{radar\_y}*\sin(\theta)$ $Vel_{veh\_y}=Vel_{radar\_x}*\sin(\theta)+Vel_{radar\_y}*\cos(\theta)$ Alternatively, the speed $Vel_{veh\_x}$ of the target A in the Veh_X axis direction in the vehicle body coordinate system is calculated according to the following formula:

$$Vel_{veh\_x} = \sqrt{Vel_{radar\_x}^2 + Vel_{radar\_y}^2} * \cos\left(\tan^{-1}\left(\frac{y_{veh}}{X_{veh}}\right)\right)$$

Step S102: Determine, based on the speed of the target and the speed of the terminal device, whether the target is a static target.

In an axle direction (the Veh_X axis direction), if a direction of the speed $Vel_{veh\_x}$ of the target A is opposite to a direction of a speed $Vel_x$ of an ego vehicle (the vehicle O), and a difference between absolute values of the speeds is less than a threshold $Th_{static}$, the target A is a static target; otherwise, the target A is a moving target. The threshold $Th_{static}$ may be 0.1 m/s.

$||Vel_{veh_x}|-|Vel_x||<Th_{static}$

Step S103: Generate a fitted line of the road divider based on the data of the plurality of collection points of the road divider.

After data of the plurality of collection points of the road divider within a specific time period (a time period T) is obtained, the data of all the collection points within the time period T may be converted into a vehicle body coordinate system at a same moment, to obtain a point map constituted by the accumulated collection points of the road divider. Straight line fitting may be performed on the plurality of collection points using a RANSAC method, to constitute the fitted line of the road divider. The fitted lines constitute a local map of the road on which the terminal device is actually located. As shown in FIG. 7, a fitted line in the local map may be used to indicate a shape of the road divider. For example, a fitted line 306 is used to indicate the road edge 301, and may be used to calculate the feature of the road on which the terminal device is located. The data of the collection point may be coordinates of the collection point, and the coordinates may be coordinates in the vehicle body coordinate system.

Step S104: Calculate, based on the data of the plurality of collection points of the road divider, the feature of the road on which the terminal device is located.

The feature of the road may be used to indicate the change in the shape of the road, and the change in the shape of the road may be indicated by the change in the shape of the road divider. The feature of the road may be obtained through calculation based on the distance between the terminal device and the road divider, or may be obtained through calculation based on the slope of the road divider. The feature of the road may include one or more of an average value of the slopes, a variance of the slopes, a variance of the distances, and an average value of the distances. Shapes of road dividers on two sides of a same road are different, and differences between elevated roads and differences between non-elevated roads are different in magnitude. Therefore, a feature parameter may further include a difference between average values of respective slopes of a plurality of road dividers, a difference between variances of the respective slopes of the plurality of road dividers, a difference between average values of respective distances of the plurality of road dividers, and a difference between variances of the respective distances of the plurality of road dividers.

It can be seen from FIG. 4A that, in an intersection region, shapes of road edges of the elevated road and the non-elevated road are different, and changes in the shapes of the road edges are different to some extent. In addition, shapes or change degrees of road edges on two sides of the elevated road are also greatly different from shapes or change degrees of road edges on two sides of the non-elevated road. Therefore, a feature parameter of a road edge may be calculated based on data of a plurality of collection points of the road edge, and the feature parameter may be used to indicate a change in a shape of the road edge.

A feature of a road (the road 303) on which the vehicle O is located may be calculated based on the data of the plurality of collection points (for example, an origin of the points 305 in FIG. 7 is the collection point) of the road divider. The slope of the road divider may be calculated based on the data of the plurality of collection points of the road divider, or the distance between the road divider and the terminal device may be further calculated. The slope of the road divider may be a slope of a fitted line at each collection point, the distance between the road divider and the terminal device may be a distance between the terminal device and the fitted line, and the distance is a vertical distance. As shown in FIG. 7, the vehicle O travels on the road 303, and the road edges of the road 303 are 301 and 302. The road 303 includes three lanes, the three lanes are distinguished using lane lines 308 and 309, and the vehicle O is actually located on a middle lane. Within the time period T, the sensor mounted on the vehicle O collects a plurality of collection points (for example, the points 305) on the road edge 301 and the road edge 302. Round points are the collection points on the road edges. For ease of presentation, only some collection points are shown in FIG. 7. The obtained data of the collection point may be a distance between the sensor and the collection point, or may be coordinates of the collection point in the vehicle body coordinate system. The fitted line 306 and a fitted line 307 are respectively fitted using the data of the plurality of collection points on the road edge 301 and the road edge 302. The fitted line 306 is a fitted line on the road edge 301, and the fitted line 307 is a fitted line on the road edge 302. A point C is a foot of a perpendicular from a vehicle O point to the fitted line 306, and a length $d_L$ of OC is a distance between the vehicle O and the road edge 301. A point B is a foot of a perpendicular from the vehicle O point to the fitted line 307, and a length $d_R$ of OB is a distance between the vehicle O and the road edge 302. In a moving process of the vehicle O, a distance between the vehicle O and the fitted line of the road divider at each moment may be calculated. A slope $k_L$ of the fitted line 306 at the point C is a slope of a straight line that crosses the point C and is tangent to the fitted line 306, and the straight line that crosses the point C and is tangent to the fitted line 306 is perpendicular to the OC. A slope $k_R$ of the fitted line 307 at the point B is a slope of a straight line that crosses the point B and is tangent to the fitted line 307, and the straight line that crosses the point B and is tangent to the fitted line 307 is perpendicular to the OB.

Optionally, the feature of the road on which the terminal device is located may include a quantity of lanes of the road on which the terminal device is located. A total quantity of lanes $Num_{lane\_count}$ on the road on which the terminal device is located is calculated based on a lane width and an intercept between each of the two road dividers on the road on which the terminal device is located and a location at which the terminal device is located, and a sequence number $id_{lane}$ of a current lane on which the terminal device is located may be further calculated.

$$Num_{lane\_count} = \text{Round}\left(\frac{d_L}{W_{Lane}}\right) + \text{Round}\left(\frac{d_R}{W_{Lane}}\right) + 1$$

$$id_{lane} = \text{Round}\left(\frac{d_L}{W_{Lane}}\right) + 1$$

The lane width $W_{Lane}$ may be obtained according to a road traffic specification, a navigation map, or visual detection. Round indicates calculation rounding down. To be specific, an actually calculated value is rounded down to a nearest integer (a direction that an absolute value decreases). As shown in FIG. 7, the distance between the vehicle O and the left road edge 301 or the fitted line 306 is $d_L$, the distance between the vehicle O and the right road edge 302 or the fitted line 307 is $d_R$, and a width of a single lane is $W_{Lane}$. It may be obtained through calculation that the sequence number $id_{lane}$ of the current lane is 2, and it may be obtained through calculation that the total quantity of lanes $Num_{lane\_count}$ of the road 303 on which the vehicle O is located is 3.

Optionally, step S105 of calculating a feature of the moving target may be included.

Based on a classification result of the static object or the moving object in 5102, M moving objects and speeds $Vel_{veh\_y}$ of the M moving objects along the Veh_Y axis direction of the vehicle body coordinate system may be obtained. M is an integer greater than 0.

When the moving target is a vehicle, the feature of the moving target may indicate a motion feature of a vehicle flow. The feature of the moving target may indicate a speed of the vehicle, or may indicate a movement track of the vehicle. The feature of the moving target may be calculated based on a speed of at least one vehicle, or may be calculated based on a slope of a movement track of the at least one vehicle. The slope may be a slope of the vehicle in the vehicle body coordinate system of the vehicle in which the sensor is located.

Optionally, the feature of the moving target may be an average value of the speeds of the M moving targets in the Veh_Y axis direction. A speed of an $i^{th}$ dynamic target of the M moving targets in the Veh_Y axis direction of the vehicle body coordinate system is denoted as $Vel_{veh_y}^i$, where i is an integer greater than 0 and less than or equal to M, and an average value $\overline{Vel_{veh_y}}$ of the speeds of the M moving targets in the Veh_Y axis direction is:

$$\overline{Vel_{veh_y}} = \sum_{M}^{i=1} |Vel_{veh_y}^i|$$

In another possible implementation, the feature of the moving target may be a minimum speed of the speeds of the M moving targets in the Veh_Y axis direction.

Optionally, the feature of the moving target may be obtained through calculation based on slopes of movement tracks of the M moving targets. In an implementation, the feature of the moving target may be a maximum slope of the slopes of the movement tracks of the M moving targets. Within the time period T (a moment t-T to a moment t), the sensor tracks the M moving objects, where M is an integer greater than 0. At the moment t-T, coordinates of the $i^{th}$ moving target in the vehicle body coordinate system at the moment t-T are $(X_{obj_i}^{t-T}, Y_{obj_i}^{t-T})$. At the moment t, coordinates of the $i^{th}$ moving target in the vehicle body coordinate system at the moment t are $(X_{obj_i}^{t}, Y_{obj_i}^{t})$. i is an integer greater than 0 and less than or equal to M. The vehicle body coordinate system at the same moment (the moment t or the moment t-T) is switched to. Within the time period T, coordinates of a start point of the $i^{th}$ moving target are $(X_{veh}^0, Y_{veh}^0)$, coordinates of an end point of the $i^{th}$ moving target are $(X_{veh}^T, Y_{veh}^T)$, and a slope of a movement track of the $i^{th}$ moving target is a slope $k_i$ of a connecting line between the start point and the end point of the $i^{th}$ moving target:

$$k_i = \frac{X_{veh}^T - X_{veh}^0}{Y_{veh}^T - Y_{veh}^0}$$

Optionally, the M moving targets may be traversed, and a maximum slope $k_{max}$ of slopes of connecting lines between start points and end points of the M moving targets in the vehicle body coordinate system is:

$k_{max} = \max\{k_i\}(i=1,2,\ldots,M)$

In another implementation, a feature parameter of the moving target may be the average value of the slopes of the movement tracks of the M moving targets.

In another implementation, the feature of the moving target may alternatively be a minimum slope of the slopes of the movement tracks of the M moving targets.

Figure 11:
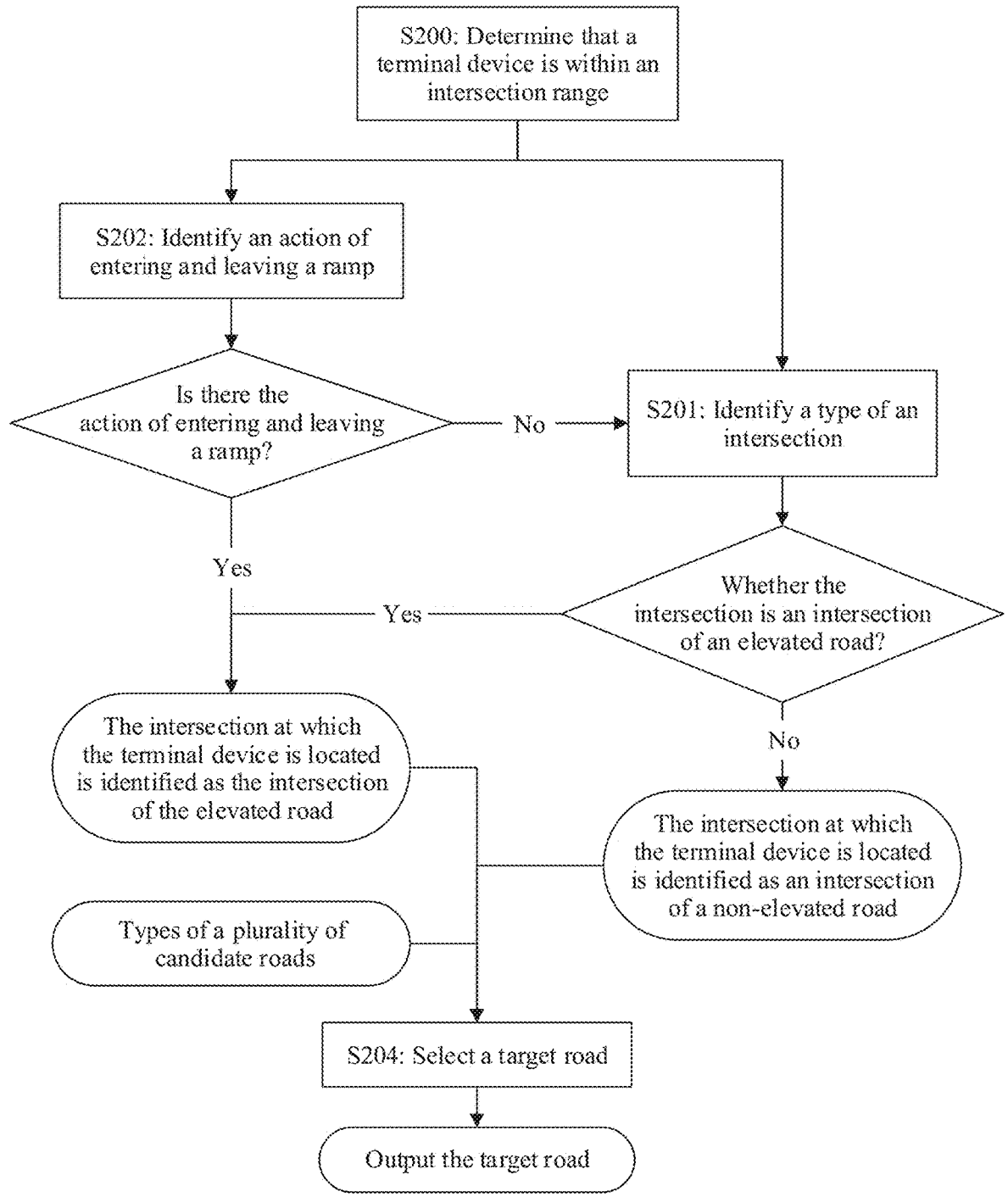
FIG. 11 is a flowchart of a positioning method according to an embodiment of the present disclosure.

After the feature of the road on which the terminal device is located is obtained, the type of the road on which the terminal device is located may be determined based on the feature of the road. Then, the target road is selected from the plurality of candidate roads based on the type of the road on which the terminal device is located and the types of the plurality of candidate roads. As shown in FIG. 11, the following steps may be included.

Step S200: Determine that the terminal device is within an intersection range.

This step is optional. The plurality of candidate roads are traversed to determine whether the terminal device enters an intersection range of a current candidate road.

Determining within the intersection range. Query is performed based on an electronic map tile number Mesh_$Id_i$ and a road number Road_$Id_i$ of an $i^{th}$ candidate road $Rd_i$, to obtain information about the candidate road $Rd_i$. The information about the candidate road may include a type of the candidate road, and may further include coordinates of a start point of the candidate road, coordinates of an end point of the candidate road, and whether the start point or end point of the candidate road is connected to an intersection. If the current candidate road is connected to the intersection, this process is continued. If the current candidate road is not connected to the intersection, a next candidate road is selected for re-determining.

$$d_I = \sqrt[2]{(X' - Rd_i \cdot EP \cdot x)^2 + (Y' - Rd_i \cdot EP \cdot y)^2}$$

In the foregoing formula, a distance $d_I$ between a current vehicle and the intersection is calculated based on endpoint coordinates ($Rd_i$.EP.x, $Rd_i$.EP.y) of the candidate road and original coordinates (X', Y') of a current terminal device, where an endpoint indicates the intersection.

$d_I < Th_{in\_I}$

In the foregoing formula, $Th_{in\_I}$ is a distance threshold for determining whether the terminal device is within the intersection range. If the foregoing formula is true, the terminal device is within the intersection range, and the following steps are performed. If the foregoing formula is not true, the next candidate road is selected for re-determining.

Step S201: Identify a type of the intersection

The type of the intersection at which the terminal device is located is identified based on the feature of the road such that the type of the road on which the terminal device is located can be determined. The type of the road may be an elevated road or a non-elevated road, and the type of the intersection may be an intersection of the elevated road or an intersection of the non-elevated road. When the terminal device crosses an intersection in a moving process, a type of the intersection may be identified.

Optionally, step s202 of identifying an action of entering or leaving a ramp may be further included.

Whether the terminal device has the action of entering or leaving a ramp is identified based on the feature of the road on which the terminal device is located. The ramp exists only at the intersection of the elevated road. Therefore, if the terminal device has the action of entering or leaving a ramp, it is determined that the type of the intersection at which the terminal device is located is the intersection of the elevated road, and the type of the road on which the terminal device is located is the elevated road. If the terminal device does not have the action of entering or leaving a ramp, step S201 may be performed.

Step S204: Select the target road.

The target road is selected from the plurality of candidate roads based on the types of the plurality of candidate roads and the type of the road on which the terminal device is located, and an ID of the target road is output. Specific details have been described in the foregoing step S3, and details are not described herein again.

Figure 12:
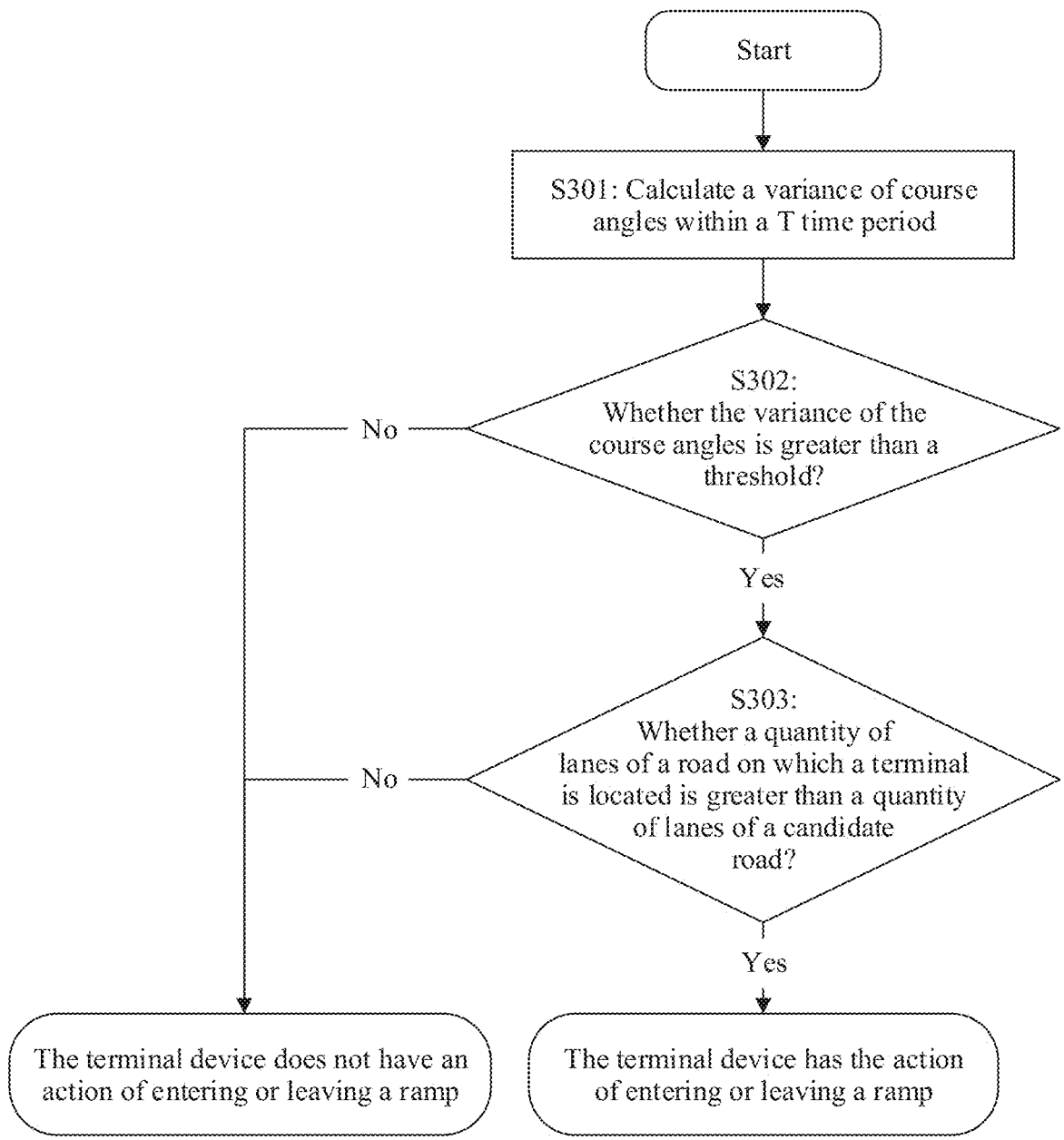
FIG. 12 is a flowchart of a positioning method according to an embodiment of the present disclosure.

As shown in FIG. 12, the step 202 of identifying the action of entering or leaving a ramp may include the following steps.

Optionally, before step S303, steps S301 and S302 may be included.

S301: Calculate a variance of course angles within the time period T.

An example in which the terminal device is a vehicle is used, and changes in course angles Yaw of the vehicle within the time period T are calculated. A variance $\sigma_{Yaw}$ of the course angles within the time period T is calculated. The course angle Yaw is an included angle between a direction of the head of the vehicle and a direction of the north of a map along a clockwise direction.

S302: Determine whether the variance of the course angles is greater than a sixth threshold.

$\sigma_{Yaw} > Th_{Yaw\_std}$

In the foregoing formula, the sixth threshold $Th_{Yaw\_std}$ is a threshold of the variance of the course angles. When $\sigma_{Yaw}$ is greater than the sixth threshold $Th_{Yaw\_std}$, to be specific, the vehicle performs an action of changing a lane, there is a possibility of entering or leaving the ramp. A value of $Th_{Yaw\_std}$ may be 0.15 rad.

If the variance of the course angles is greater than the sixth threshold, the step S303 may be performed. If the variance of the course angles is less than or equal to the sixth threshold, it is determined that the terminal device does not have the action of entering or leaving a ramp.

S303: Determine whether the quantity of lanes of the road on which the terminal device is located is greater than a quantity of lanes of each of the candidate roads.

Figure 13:
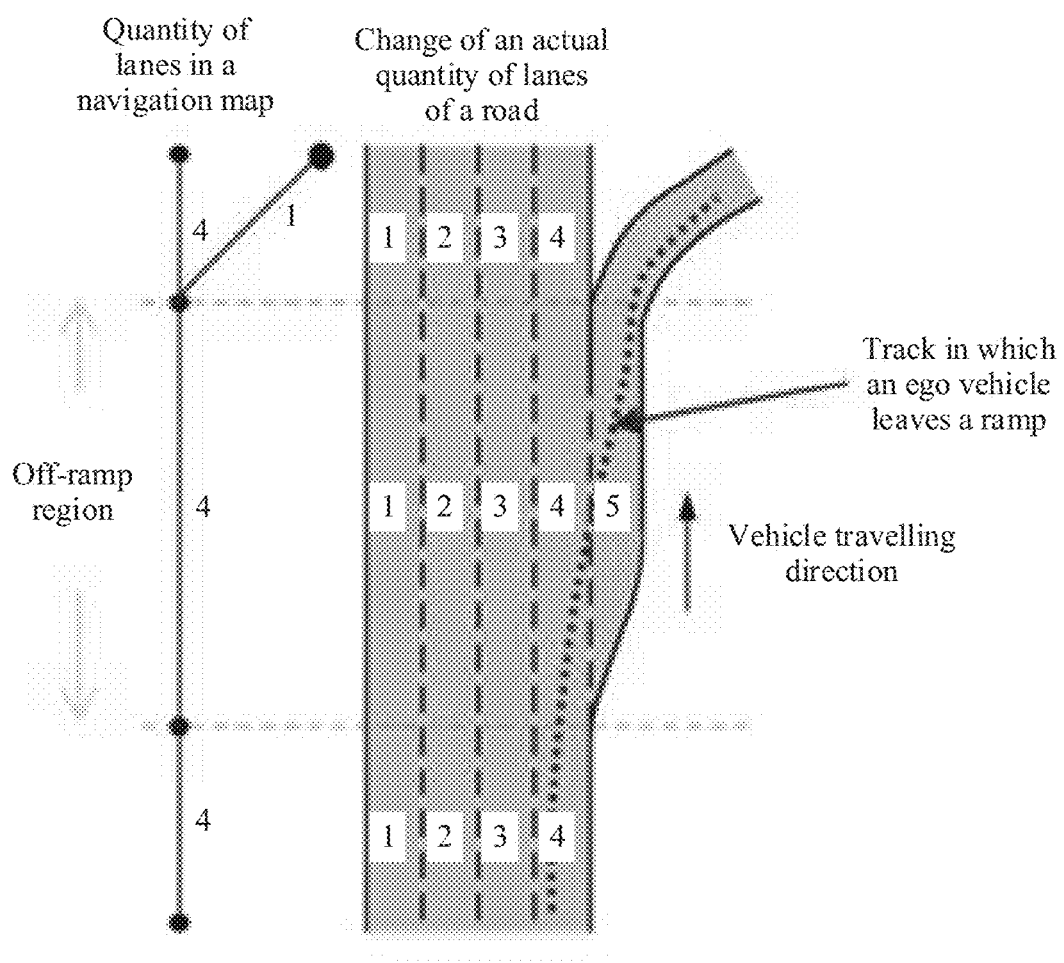
FIG. 13 is a schematic diagram of a quantity of lanes according to an embodiment of the present disclosure.

The map data stores the quantity of lanes of the road. For a relationship between the quantity of lanes of the road in the map data and an actual quantity of lanes of the road, refer to FIG. 13. It can be seen from FIG. 13 that, in the quantity of lanes that is of the road and that is stored in the map data, a temporary new lane of an on-ramp/off-ramp region is not considered. For example, a lane numbered 5 is the temporary new lane of the on-ramp/off-ramp region. Therefore, in this region, a quantity of lanes that is of the road and that is stored in the map data is less than an actual quantity of lanes of the road. If the quantity of lanes $Num_{lane}$ count that is of the road on which the vehicle is located and that is calculated based on the feature of the road on which the vehicle is located in S104 is greater than the quantity of lanes $Map_{lane}$ count that is of the candidate roads and that is obtained from the map data, the vehicle is located in the on-ramp/off-ramp intersection region on the elevated road, the vehicle has the action of entering or leaving a ramp, and the type of the road on which the vehicle is located is the elevated road. Alternatively, if the sequence number $id_{lane}$ that is of the lane on which the vehicle is located and that is calculated based on the feature of the road on which the vehicle is located in S104 is greater than the quantity of lanes $Map_{lane}$ count on the navigation map, the vehicle is located in the on-ramp/off-ramp region on the elevated road, the vehicle has the action of entering or leaving a ramp, and the road on which the vehicle is located is an elevated road.

Optionally, whether the vehicle has the action of entering or leaving a ramp is determined for a plurality of times at a plurality of moments using steps S301 to S303. If it is determined for N times whether the vehicle enters or leaves the ramp, and determining results for n times are that the vehicle has the action of entering or leaving a ramp, $R_{in\_out\_ramp}=n/N$, where $R_{in\_out\_ramp}$ indicates a proportion of the determining results that the vehicle has the action of entering or leaving a ramp. If the proportion of the determining results that the vehicle has the action of entering or leaving a ramp is greater than a threshold, it is determined that the vehicle has the action of entering or leaving a ramp:

$$R_{in\_out\_ramp} > Th_{percentage\_in\_out\_ramp}$$

$Th_{percentage\_in\_out\_ramp}$ is the threshold for determining that the vehicle has the action of entering or leaving a ramp.

Figure 14:
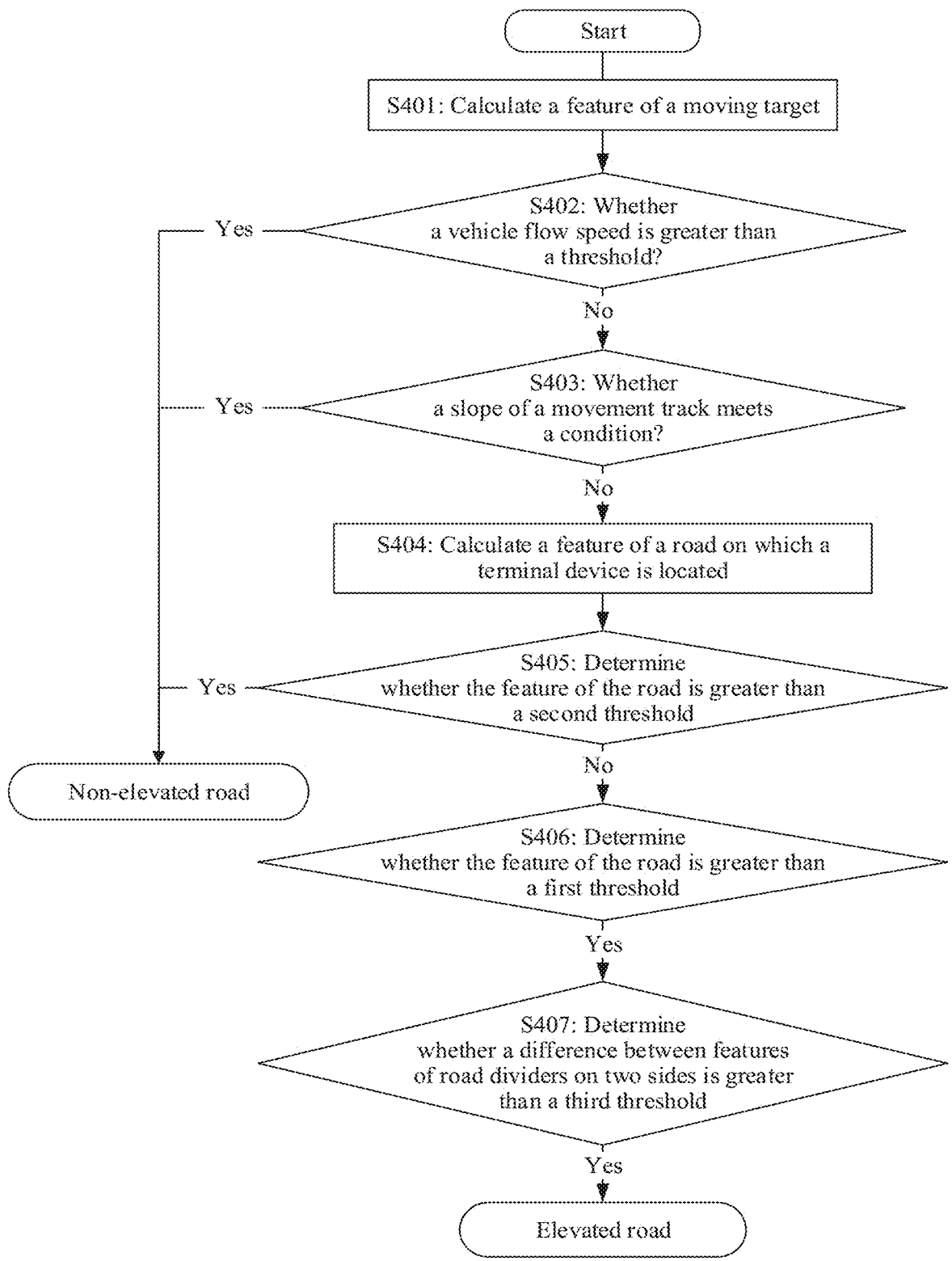
FIG. 14 is a flowchart of a positioning method according to an embodiment of the present disclosure.

As shown in FIG. 14, the step 201 of identifying the type of the intersection may include the following steps.

S404: Calculate the feature of the road on which the terminal device is located.

The feature of the road may be used to indicate the change in the shape of the road, and the change in the shape of the road may be indicated by the change in the shape of the road divider. The feature of the road may be obtained through calculation based on the distance between the terminal device and the road divider, or may be obtained through calculation based on the slope of the road divider. The feature of the road may include one or more of the average value of the slopes, the variance of the slopes, the variance of the distances, and the average value of the distances. For calculation methods of the slope and the distance, refer to the foregoing step 104, and details are not described herein again.

Based on data that is of the road dividers and that is collected by the sensor within the time period T, the slopes of the road dividers on the two sides of the road and the distances between the terminal device and the road dividers are calculated, and an average value of slopes of the road dividers on each of the two sides, a variance of the slopes of the road dividers on each of the two sides, an average value of distances between the terminal device and the road dividers on each side, and a variance of the distances between the terminal device and the road dividers on each side are calculated. Road dividers on the left and right sides of the road are used as an example. An average value of distances between the road dividers on the left side and the terminal device is $\mu_{D_L}$, a variance of the distances between the road dividers on the left side and the terminal device is $\sigma_{D_L}$, an average value of slopes of the road dividers on the left side is $\mu_{K_L}$, and a variance of the slopes of the road dividers on the left side is $\sigma_{K_L}$. An average value of distances between the road dividers on the right side and the terminal device is $\mu_{D_R}$, a variance of the distances between the road dividers on the right side and the terminal device is $\sigma_{D_R}$, an average value of slopes of the road dividers on the right side is $\mu_{K_R}$, and a variance of the slopes of the road dividers on the right side is $\sigma_{K_R}$.

Figure 15:
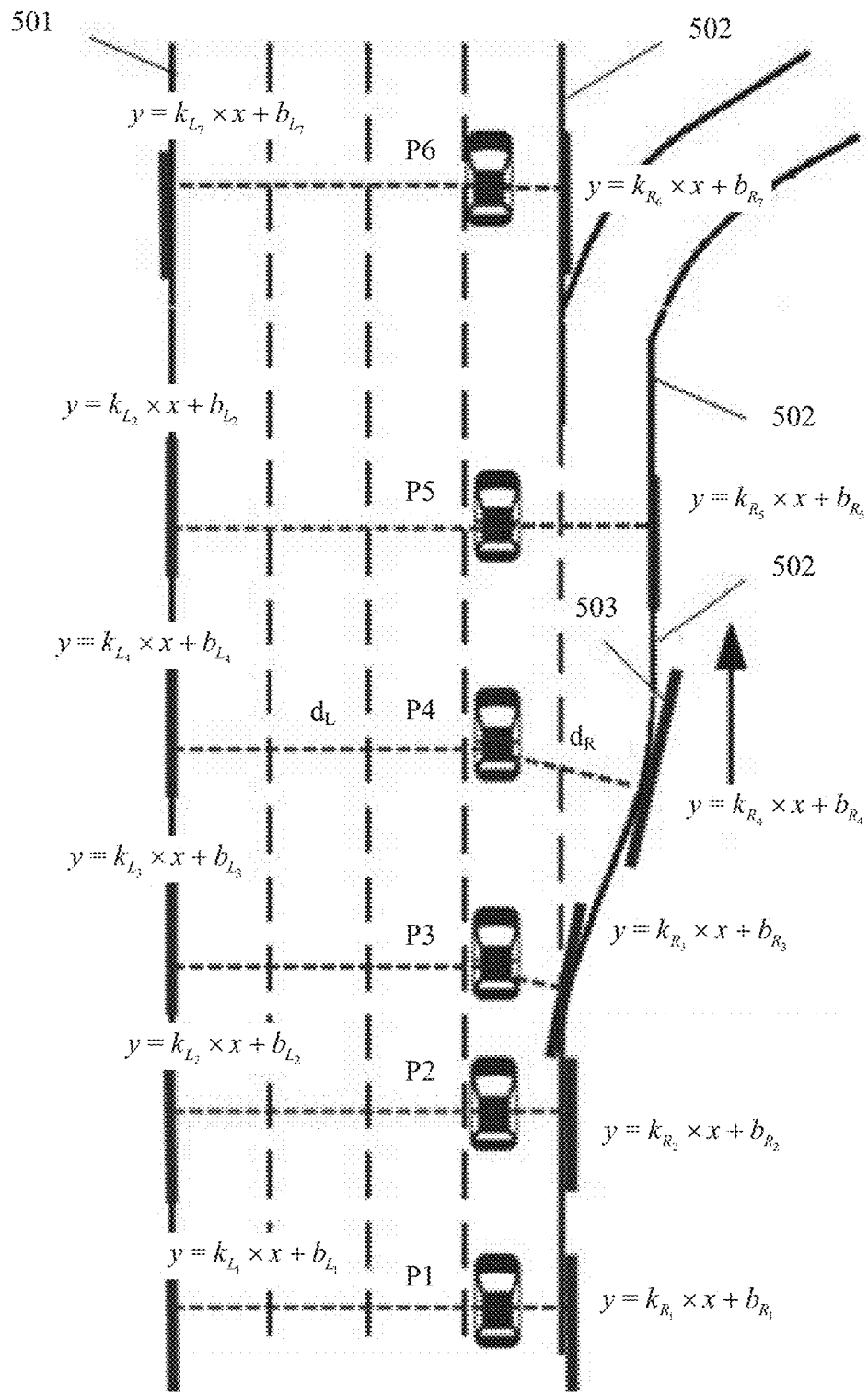
FIG. 15 is a schematic diagram of an elevated road according to an embodiment of the present disclosure.
Figure 16:
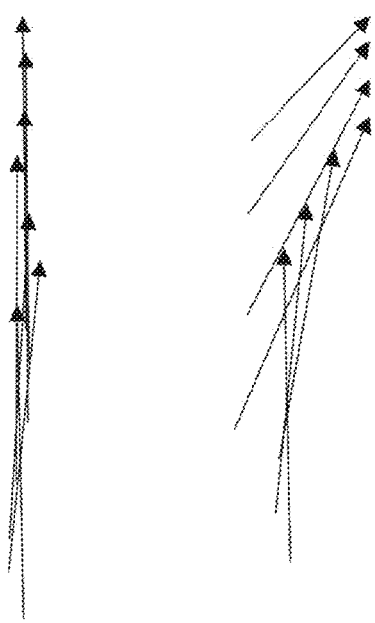
FIG. 16 is a schematic diagram of reflecting a feature of a road divider in an intersection region of an elevated road according to an embodiment of the present disclosure.
Figure 17:
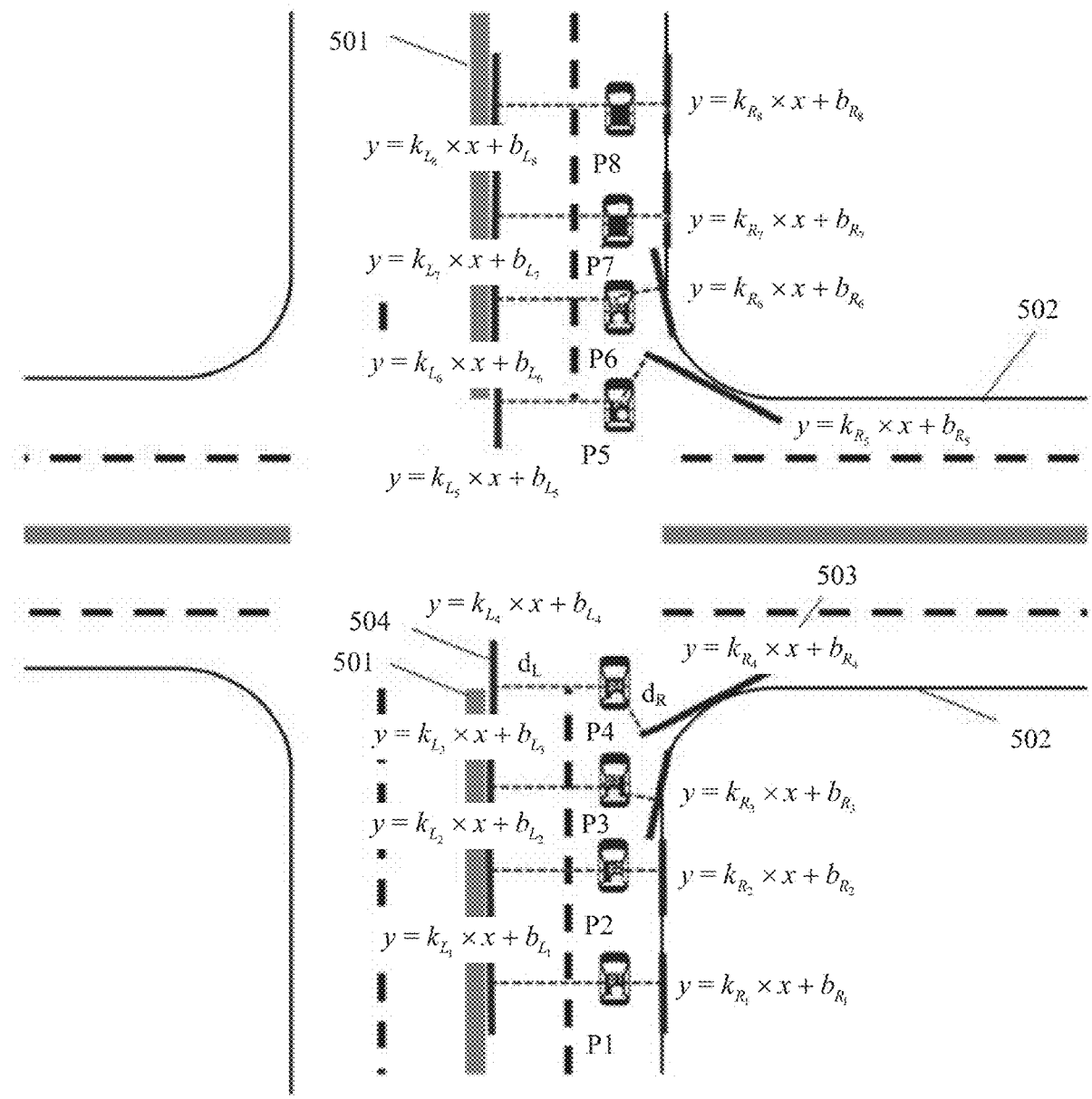
FIG. 17 is a schematic diagram of a crossroad of a non-elevated road according to an embodiment of the present disclosure.
Figure 18:
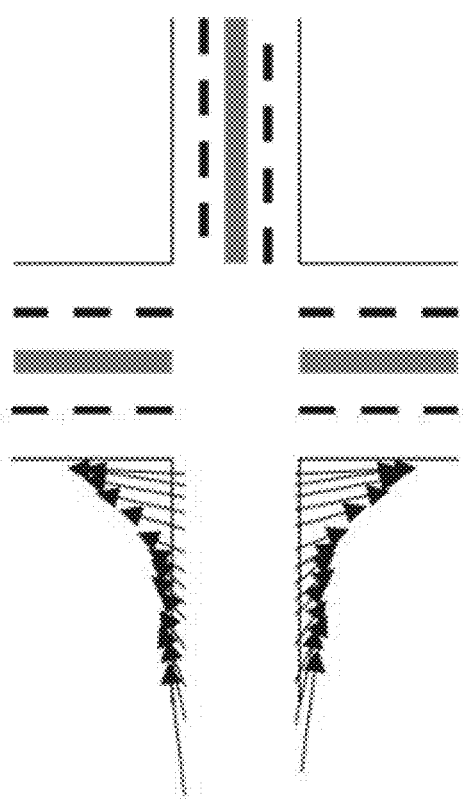
FIG. 18 is a schematic diagram of reflecting a feature of a road divider in a crossroad region of a non-elevated road according to an embodiment of the present disclosure.

FIG. 15 and FIG. 16 may vividly present changes in slopes of road dividers in a ramp intersection region of the elevated road. FIG. 17 and FIG. 18 may vividly present changes in slopes of road dividers of a crossroad region (the intersection of the non-elevated road). Black arrows in FIGS. 16 and 18 represent slopes at collection points of the road dividers.

FIG. 15 shows a ramp intersection of the elevated road, and a type of the road is an elevated road. As a vehicle travels north (from bottom to top in the figure), changes in distances between left and right road edges and the vehicle and changes in slopes of the left and right road edges can be clearly reflected in the figure. Locations of the vehicle at six moments are respectively P1, P2, P3, P4, P5 and P6. A line 503 is used as an example. The line 503 represents a line that is perpendicular to a perpendicular line from the P4 to a road edge 502 when the vehicle is located at the P4, and a slope of the line 503 in the vehicle body coordinate system may be a slope of the road edge corresponding to the P4. At the six moments, a slope of a left road edge 501 and a distance $d_L$ between the left road edge 501 and the vehicle almost remain unchanged. For a slope of the right road edge 502 and a distance $d_R$ between the right road edge 502 and the vehicle, as the vehicle approaches approach the ramp intersection region, absolute values of $k_{R_1}$ to $k_{R_4}$ increase, and absolute values of $k_{R_4}$ and $k_{R_5}$ decrease. Absolute values of $d_{R_1}$ to $d_{R_5}$ gradually increase. When the vehicle is far away from a ramp, an absolute value of $d_{R_6}$ decreases suddenly and approaches $d_{R_1}$.

FIG. 17 shows a crossroad, and a type of the road is a non-elevated road. As a vehicle travels north (from bottom to top in the figure), changes in distances between and left and right road edges and the vehicle and changes in slopes of the left and right road edges can be clearly reflected in the figure. Locations of the vehicle at eight moments are respectively P1, P2, P3, P4, P5, P6, P7, and P8. A line 503 is used as an example. The line 503 represents a line that is perpendicular to a perpendicular line from the P4 to a road edge 502 when the vehicle is located at the P4, and a slope of the line 503 in the vehicle body coordinate system may be a slope of the road edge corresponding to the P4. A slope of a left road edge 501 and a distance $d_L$ between the left road edge and the vehicle almost remain unchanged. For a slope of the right road edge 502 and a distance $d_R$ between the right road edge and the vehicle, as the vehicle approaches the crossroad, absolute values of $k_{R_1}$ to $k_{R_4}$ gradually increase, an absolute value of $k_{R_4}$ gradually approaches infinity, and absolute values of $k_{R_5}$ to $k_{R_8}$ gradually decrease.

S405: Determine whether the feature of the road is greater than a second threshold.

It can be learned from the foregoing descriptions that slopes of road dividers on left and right sides of an intersection region of the non-elevated road change more sharply than slopes of road dividers on left and right sides of the ramp intersection region of the elevated road. Distances between the road dividers on the left and right sides of the intersection region of the non-elevated road and the terminal device change more sharply than distances between the road dividers on the left and right sides of the ramp intersection region of the elevated road and the terminal device. Therefore, it is determined whether the feature of the road meets a condition. Corresponding thresholds may be set for different road features. If a value of any feature of the average value of the slopes of the road dividers, the variance of the slopes of the road dividers, the average value of the distances between the road dividers and the terminal device, and the variance of the distances between the road dividers and the terminal device is greater than a threshold corresponding to the feature, it is determined that the intersection at which the terminal device is located is the intersection of the non-elevated road, for example, a crossroad on the ground, and the type of the road on which the terminal device is located is the non-elevated road. If a value of any feature of the average value of the slopes of the road dividers, the variance of the slopes of the road dividers, the average value of the distances between the road dividers and the terminal device, and the variance of the distances between the road dividers and the terminal device is less than a threshold corresponding to the feature, it is determined that the intersection at which the terminal device is located is the intersection of the elevated road, for example, the ramp intersection, and the type of the road on which the terminal device is located is the elevated road.

It is determined whether a plurality of features of the road on which the terminal device is located are greater than second thresholds corresponding to the features. The second threshold is a threshold of a road feature of the intersection region of the non-elevated road, and specific values of the second thresholds corresponding to all the features may be different or may be the same. An example in which the non-elevated road is located in a crossroad region is used. It can be seen from FIG. 17 that a change in a road edge of the crossroad is clear. When the vehicle crosses the crossroad, it is clear that both the slopes of the left and right road edges and distances between the left and right road edges and the vehicle change. Therefore, when any one of the plurality of features of the road on which the terminal device is located is greater than a threshold corresponding to the feature, it is determined that the vehicle is located in the intersection region of the non-elevated road.

$\sigma_{D_L} > Th_{down\_distance\_std}$ $\mu_{D_L} > Th_{down\_distance\_mean}$ $\sigma_{K_L} > Th_{down\_slop\_std}$ $\mu_{K_L} > Th_{down\_slop\_mean}$ $\sigma_{D_R} > Th_{down\_distance\_std}$ $\mu_{D_R} > Th_{down\_distance\_mean}$ $\sigma_{K_R} > Th_{down\_slop\_std}$ $\mu_{K_R} > Th_{down\_slop\_mean}$ $Th_{down\_distance\_std}$, $Th_{down\_distance\_mean}$, $Th_{down\_slop\_std}$, and $Th_{down\_slop\_mean}$ are respectively a threshold corresponding to a variance of distances between the road dividers in the intersection region of the non-elevated road and the terminal device, a threshold corresponding to an average value of the distances between the road dividers in the intersection region of the non-elevated road and the terminal device, a threshold corresponding to a variance of the slopes of the road dividers in the intersection region of the non-overhead road, and a threshold corresponding to an average value of the slopes of the road dividers in the intersection region of the non-overhead road. The threshold may be a value obtained by measuring and collecting statistics on an actual road. When any one of the plurality of features of the road exceeds the corresponding threshold, it is output that the type of the road on which the terminal device is located is the non-elevated road.

Optionally, S406 of determining whether the feature of the road is less than a first threshold is further included.

If each of the features of the road on which the terminal device is located is less than or equal to the second threshold corresponding to each feature, it is determined whether each of the plurality of features of the road on which the terminal device is located is less than a first threshold corresponding to the feature. The first threshold is a threshold of a road feature of the intersection region of the elevated road. Specific values of the first thresholds corresponding to the features may be different or may be the same, and the first threshold corresponding to each feature is less than the second threshold corresponding to the feature. It can be seen from FIG. 15 that the feature of the road of the intersection region of the elevated road changes slowly. Therefore, it is determined, using the following formula, whether an intersection at which the vehicle approaches is the intersection of the elevated road:

$\sigma_{D_L} < Th_{up\_distance\_std}$ $\mu_{D_L} < Th_{up\_distance\_mean}$ $\sigma_{K_L} < Th_{up\_slop\_std}$ $\mu_{K_L} < Th_{up\_slop\_mean}$ $\sigma_{D_R} < Th_{up\_distance\_std}$ $\mu_{D_R} < Th_{up\_distance\_mean}$ $\sigma_{K_R} < Th_{up\_slop\_std}$ $\mu_{K_R} < Th_{up\_slop\_mean}$ $Th_{up\_distance\_std}$, $Th_{up\_distance\_mean}$, $Th_{up\_distance\_std}$, and $Th_{up\_stop\_mean}$ are respectively a threshold corresponding to a variance of distances between the road dividers in the intersection region of the elevated road and the terminal device, a threshold corresponding to an average value of the distances between the road dividers in the intersection region of the elevated road and the terminal device, a threshold corresponding to a variance of the slopes of the road dividers in the intersection region of the elevated road, and a threshold corresponding to an average value of the slopes of the road dividers in the intersection region of the elevated road. When each of the plurality of features of the road on which the terminal device is located is less than the corresponding second threshold, it may be output that the road on which the terminal device is located is the elevated road.

Optionally, when each of the plurality of features of the road on which the terminal device is located is less than the corresponding second threshold, S407 may be performed to determine, for one of the plurality of features, whether a difference between the features of the road dividers on the two sides is greater than a third threshold. The third threshold is used to indicate a threshold of the difference between the features of the road dividers on the two sides of the elevated road.

It can be seen from FIG. 15 that when the vehicle crosses the intersection of the elevated road, a difference between the slopes of the road edges on the two sides and a difference between the distances between the road edges on the two sides and the vehicle change slowly. Therefore, whether the vehicle is located at the intersection of the elevated road is determined based on a value difference between features of the road edges on the two sides:

$$|\mu_{K_L}-\mu_{K_R}|>Th_{diff\_slop\_mean}$$

$$|\mu_{D_R}-\mu_{D_L}|>Th_{diff\_dis\_mean}$$

$$|\sigma_{D_L}-\sigma_{D_R}|>Th_{dif\_dis\_std}$$

$$|\sigma_{K_L}-\sigma_{K_R}|>Th_{dif\_slop\_std}$$

$Th_{diff\_dis\_mean}$, $Th_{diff\_dis\_std}$, $Th_{diff\_slop\_mean}$, and $Th_{diff\_slop\_dis}$ are respectively a threshold corresponding to a difference between average values of distances between the road dividers on the two sides and the terminal device, a threshold corresponding to a difference between variances of the distances between the road dividers on the two sides and the terminal device, a threshold corresponding to a difference between average values of slopes of the road dividers on the two sides, and a threshold corresponding to a difference between variances of the slopes of the road dividers on the two sides. When the difference of the distances between the left and right road edges or the difference of the slopes between the left and right road edges exceeds the threshold, it indicates that the road on which the terminal device is currently located is an elevated road.

Before step S404, step S401 of calculating the feature of the moving target may be further included.

The feature of the moving object is a motion feature of the moving object. The feature of the moving object may be indicated by a speed of the moving object, may be indicated by a movement track of the moving object, or may be indicated by a slope of a movement track of the moving object.

Optionally, the feature of the moving target may be obtained through calculation based on a speed $Vel_{veh_y}$ of the moving target in a transverse direction, and, may be the speed of the moving target in the transverse direction, or may be an average value $\overline{Vel_{veh}}$ of speeds of a plurality of moving targets in the transverse direction. The feature of the moving object may alternatively be the slope of the movement track of the moving object. For specific calculation, refer to step 105, and the details are not described herein.

Figure 19:
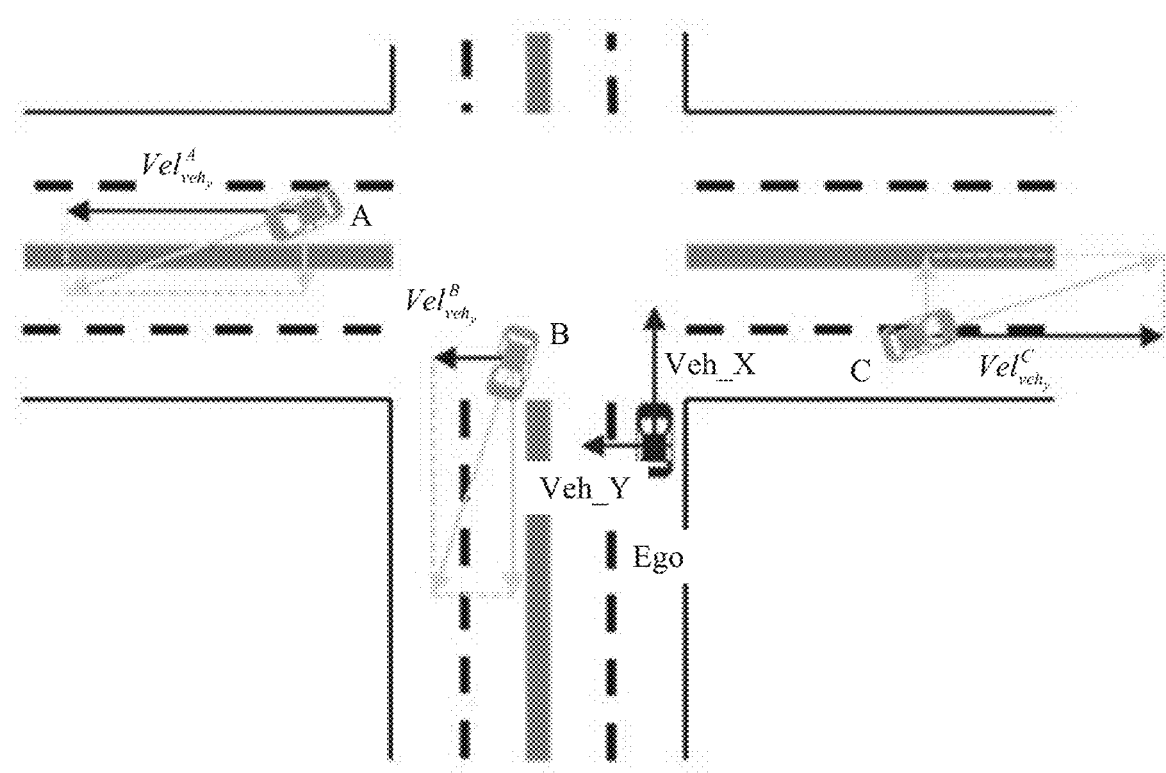
FIG. 19 is a schematic diagram of a vehicle flow speed in a crossroad region of a non-elevated road according to an embodiment of the present disclosure.

For example, as shown in FIG. 19, a vehicle Ego is the foregoing terminal device, and may be mounted with a sensor, for example, a millimeter-wave radar. The vehicle Ego is on a non-elevated road and is located in a crossroad region. In step 102, the vehicle Ego identifies three moving targets, a vehicle A, a vehicle B, and a vehicle C. According to calculation in step 101, speeds $Vel_{veh\_y}$ of the vehicle A, the vehicle B, and the vehicle C in the Veh_Y axis direction of the vehicle body coordinate system are respectively $Vel_{veh_y}^A$, $Vel_{veh_y}^B$, and $Vel_{veh_y}^C$. An average value of the speeds of the three moving objects (the vehicle A, the vehicle B, and the vehicle C) in the Veh_Y axis direction of the vehicle body coordinate system is calculated. In other words, an average value of $Vel_{veh_y}^A$, $Vel_{veh_y}^B$, and $Vel_{veh_y}^C$ is calculated.

Figure 20:
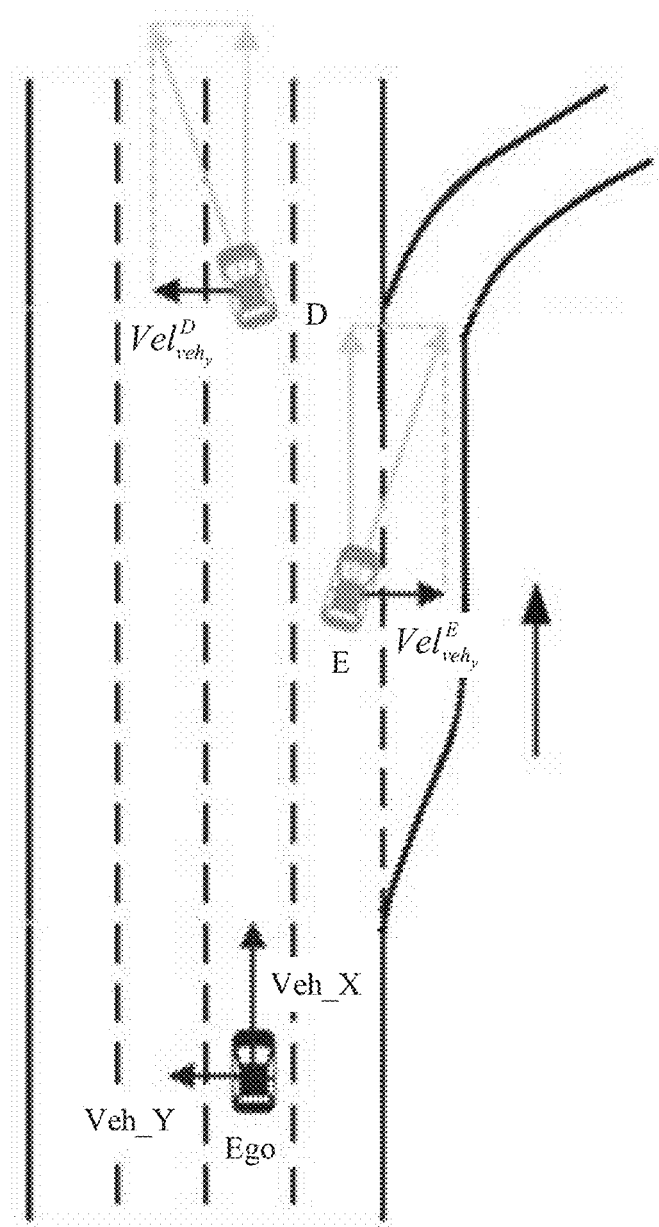
FIG. 20 is a schematic diagram of a vehicle flow speed in an intersection region of an elevated road according to an embodiment of the present disclosure.

As shown in FIG. 20, a vehicle Ego is the foregoing terminal device, and may be mounted with a sensor, for example, a millimeter-wave radar. The vehicle Ego is on an elevated road and is located in a ramp intersection region. In step 102, the vehicle Ego identifies two moving targets, a vehicle D and a vehicle E. According to calculation in step 101, speeds $Vel_{veh\_y}$ of the vehicle D and the vehicle E in the Veh_Y axis direction of the vehicle body coordinate system are respectively $Vel_{veh_y}^E$ and $Vel_{veh_y}^D$. An average value of the speeds of the two moving targets (the vehicle D and the vehicle E) in the Veh_Y axis direction of the vehicle body coordinate system is calculated. In other words, an average value of $Vel_{veh_y}^E$ and $Vel_{veh_y}^D$ is calculated.

Optionally, the feature of the moving object may be the slope of the movement track of the moving object, and the slope may be calculated based on a start point and an end point of the movement track.

Figure 21:
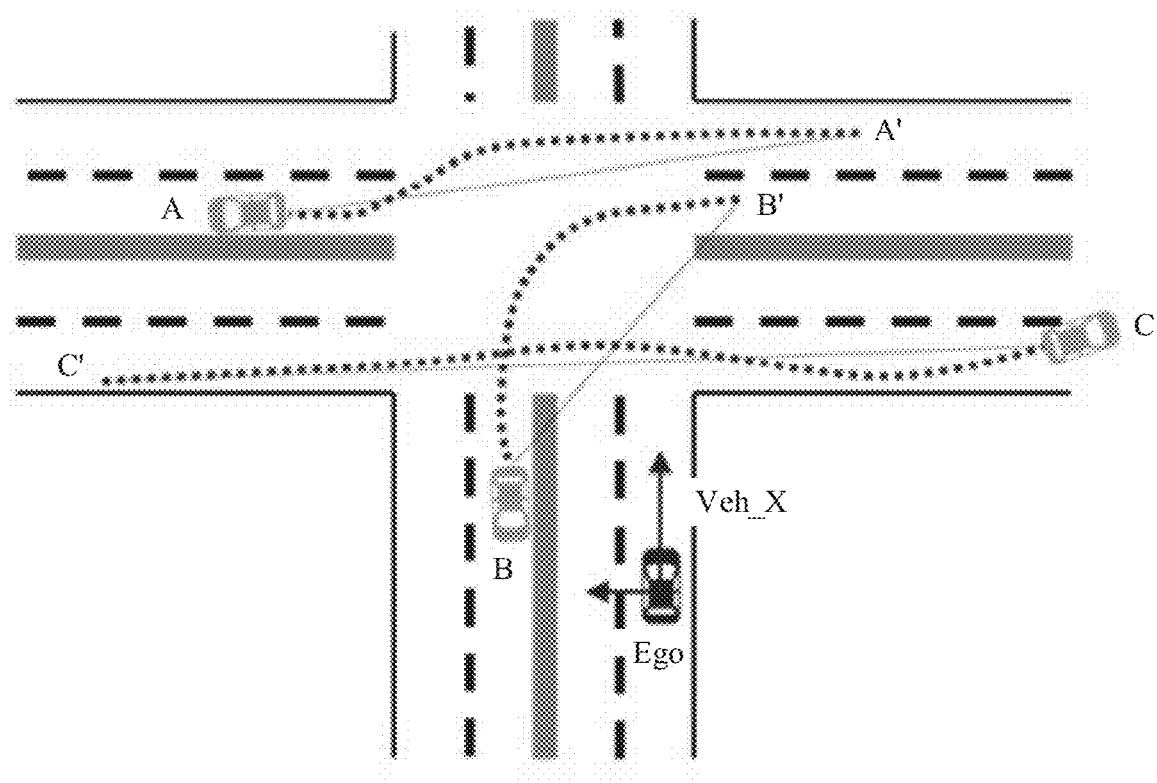
FIG. 21 is a schematic diagram of a vehicle movement track in a crossroad region of a non-elevated road according to an embodiment of the present disclosure.

For example, as shown in FIG. 21, a vehicle Ego is the foregoing terminal device, and may be mounted with a sensor, for example, a millimeter-wave radar. The vehicle Ego is on a non-elevated road and is located in a crossroad region. In step 102, the vehicle Ego identifies three moving targets, a vehicle A, a vehicle B, and a vehicle C. The vehicle Ego is used as an ego vehicle, and the vehicle Ego tracks movement tracks of the vehicle A, the vehicle B, and the vehicle C using the sensor. A vehicle body coordinate system in which the vehicle Ego is used as an origin is shown in FIG. 21. An X axis is Veh_X, and a Y axis is Veh_Y. In the vehicle body coordinate system, the movement track of the vehicle A is a curved dashed line A'-A, the movement track of the vehicle B is a curved dashed line B'-B, and the movement track of the vehicle C is a curved dashed line C'-C. The vehicle A is used as an example. In the vehicle body coordinate system, within the time period T, coordinates of a start point A' of the moving target vehicle A is $(X_{veh}^0, Y_{veh}^0)$, and coordinates of an end point A is $(X_{veh}^T, Y_{veh}^T)$. A slope $k_A$ of the movement track of the moving target vehicle A is calculated according to the method described in step S105. Therefore, slopes $k_B$ and $k_C$ of the movement tracks of the moving target vehicles B and C are separately calculated.

Figure 22:
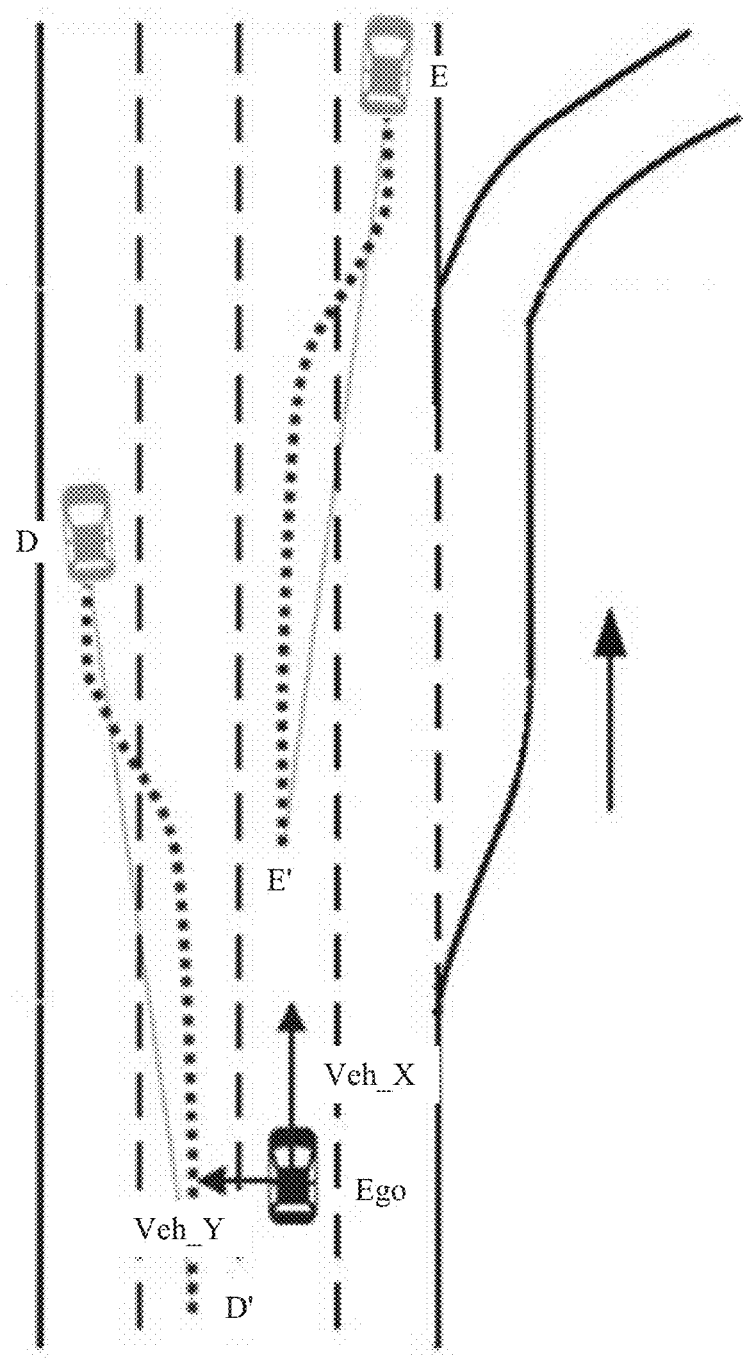
FIG. 22 is a schematic diagram of a vehicle movement track in a crossroad region of a non-elevated road according to an embodiment of the present disclosure.

As shown in FIG. 22, a vehicle Ego is the foregoing terminal device, and may be mounted with a sensor, for example, a millimeter-wave radar. The vehicle Ego is on an elevated road and is located in a ramp intersection region. In step 102, the vehicle Ego identifies two moving targets, a vehicle D and a vehicle E. The vehicle Ego is used as an ego vehicle, and the vehicle Ego tracks movement tracks of the vehicle D and the vehicle E using the sensor. A vehicle body coordinate system in which the vehicle Ego is used as an origin is shown in FIG. 22. An X axis is Veh_X, and a Y axis is Veh_Y. In the vehicle body coordinate system, the movement track of the vehicle D is a curved dashed line D'-D, and the movement track of the vehicle E is a curved dashed line E'-E. The vehicle D is used as an example. In the vehicle body coordinate system, within the time period T, coordinates of a start point D' of the moving target vehicle D is $(X_{veh}^0, Y_{veh}^0)$, and coordinates of an end point D is $(X_{veh}^1,$ $Y_{veh}^T$). A slope $k_D$ of the movement track of the moving target vehicle D is calculated according to the method described in step S105.

Optionally, the feature of the moving target may alternatively be obtained through calculation based on the slope of the movement track. The feature of the moving target may be a maximum slope of slopes of movement tracks of a plurality of moving targets, or a minimum slope of the slopes of the movement tracks of the plurality of moving targets, or an average value of the slopes of the movement tracks of the plurality of moving targets.

S402: Determine whether the speed of the moving target is greater than a fourth threshold.

It is determined whether the average value of the speeds of the plurality of moving objects in the transverse direction, namely, the Veh_Y axis direction of the vehicle body coordinate system, is greater than the threshold:

$$|\overline{Vel_{veh_y}}| > Th_{Vel_y}$$

$Th_{vel_y}$ is a threshold of a speed at which the moving target transversely passes the terminal device, and is referred to as the fourth threshold. When $\overline{Vel_{veh_y}}$ is greater than the fourth threshold $Th_{vel_y}$, the moving target moves greatly along the transverse direction. Therefore, it is determined that the intersection at which the terminal device is located is a crossroad under the elevated road, namely, the intersection of the non-elevated road, and that the type of the road at which the terminal device is located is the non-elevated road. When $\overline{Vel_{veh_y}}$ is less than or equal to the fourth threshold $Th_{veh_y}$, S403 may be performed to continue processing.

$$k_i = \frac{X_{veh}^T - X_{veh}^0}{Y_{veh}^T - Y_{veh}^0}$$

$$k_{min} = \min\{k_i\} \, (i = 1, 2, \ldots, M_{tracked})$$

A slope $k_i$ of a connecting line between a start point and an end point of an $i^{th}$ tracking target in the vehicle body coordinate system at the time point t is calculated. Each object successfully traced is traversed, and a minimum slope $k_{min}$ of slopes of connecting lines between start points and end points of all traced objects in the vehicle body coordinate system is obtained.

S403: Determine whether the slope of the movement track of the moving target meets a condition.

Optionally, whether the slope of the movement track of the moving target is greater than a threshold is determined. If the slope of the movement track of the moving target is greater than the threshold, it is determined that the type of the road on which the terminal device is located is the non-elevated road. If the slope of the movement track of the moving target is less than or equal to the threshold, step S404 may be performed to continue determining, or it is determined that the type of the road on which the terminal device is located is the elevated road.

Optionally, it is determined whether an absolute value of the minimum slope of the slopes of the movement tracks of the moving objects is less than a fifth threshold.

$$|k_{min}| < Th_k$$

In the foregoing formula, whether the minimum slope of the slopes of the movement tracks is less than the fifth threshold $Th_k$ is determined, where $Th_k$ is a threshold of the slope of the movement track of the moving target that transversely passes the terminal device. When the absolute value of $k_{min}$ is less than the fifth threshold $Th_k$, at least one moving target transversely passes in front of the terminal device, and it is determined that the road on which the terminal device is located is a non-elevated road. If the absolute value of $k_{min}$ is greater than or equal to the threshold $Th_k$, step S404 may be performed to continue determining, or it is determined that the type of the road on which the terminal device is located is the elevated road.

Optionally, it is determined whether an absolute value of the maximum slope of the slopes of the movement tracks of the moving targets is greater than a threshold.

The M moving targets are traversed, where M is an integer greater than 0, i is an integer greater than 0, and i is less than or equal to M. The maximum slope $k_{max}$ of slopes of connecting lines between start points and end points of the M moving objects in the vehicle body coordinate system is obtained.

$$k_{max} = \max\{k_i\} \, (i = 1, 2, \ldots, M)$$

$$|k_{max}| > Th_k$$

In the foregoing formula, whether the maximum slope of the slopes of the movement tracks is greater than the threshold $Th_k$ is determined, where $Th_k$ is the threshold of the slope of the movement track of the moving target that transversely passes the terminal device. When the absolute value of $k_{max}$ is greater than the threshold $Th_k$, at least one moving target transversely passes in front of the terminal device, and it is determined that the road on which the terminal device is located is a non-elevated road. The threshold $Th_k$ is obtained by collecting statistics on the slope of the movement track of the vehicle when the vehicle transversely crosses the intersection region of the non-elevated road. The threshold may be set to 1. If the absolute value of $k_{max}$ is less than or equal to the threshold $Th_k$, step S404 may be performed to continue determining, or it is determined that the type of the road on which the terminal device is located is the elevated road.

The type of the intersection at which the terminal device is located is determined based on the feature parameter of the road divider, and the type of the intersection may correspond to the type of the road at which the intersection is located. For example, the type of the intersection may be the intersection of the elevated road or the intersection of the non-elevated road. When it is determined that the type of the intersection at which the terminal device is located is the intersection of the elevated road, it is determined that the type of the road on which the terminal device is located is the elevated road.

According to the positioning method provided in the embodiments of this application, based on the road feature detected by the millimeter-wave radar, the action of entering or leaving a ramp is identified and a road intersection scenario is identified, to effectively determine a current road and increase road matching precision, so as to increase positioning precision. An inner ring in Shanghai is used as an example, positioning precision of the present disclosure is increased from 72% of conventional road matching to 92%. In addition, the method may be applicable to an elevated region, and accurate positioning precision can also be provided in the road stacking scenario. The present disclosure does not depend on a slope assumption, and can be used in more urban elevated road scenarios. The present disclosure, a vehicle can be determined as long as the vehicle crosses an intersection, and real-time performance of matching is better. In this application, map matching is performed using a low-cost and widely commercial roadlevel navigation map, and dependence on prior information is low. Hardware dependency of the present disclosure is a common GNSS system and the millimeter-wave radar. The foregoing devices are easy to obtain on a vehicle equipped with an automatic/semi-automatic driving function, and are easy to be commercially promoted subsequently.

After the terminal device is positioned according to the positioning method provided in the embodiments of this application, the corrected coordinates of the terminal device are obtained, and a positioning error may be calculated based on a distance between the corrected coordinates and the original coordinates. A positioning precision prior map with positioning precision information is calculated based on positioning errors corresponding to a plurality of times of positioning. The following steps may be included.

S501: Classify track points.

The track point is a location represented by original positioning coordinates of the terminal device. After track data obtained through the plurality of times of positioning is obtained, each track point has an ID of an optimally matched road and a matching degree that are obtained according to the positioning method provided in the embodiments of this application. If the matching degree is greater than a threshold, the track point is reserved. If the matching degree is less than or equal to the threshold, the track point is eliminated. The track points are grouped based on the ID of the optimally matched road. If analysis objects are N roads, there are N groups of track data, where N is an integer greater than 0.

S502: Perform cluster analysis

For an $i^{th}$ road, spatial interpolation is performed on track points of the road based on positioning precision using a spatial analysis method, to obtain a grid map of positioning precision. A value of each grid indicates positioning precision of a corresponding region.

Figure 23:
FIG. 23 is a schematic diagram of a positioning precision map according to an embodiment of the present disclosure.

As shown in FIG. 23, FIG. 23 is a spatially interpolated positioning precision prior map obtained based on a plurality of pieces of offline track data after a plurality of times of traveling in the inner ring in Shanghai. A deeper color indicates a larger positioning error and lower precision of the region, and a lighter color indicates higher precision of the region.

Further, in this application, the map may be further divided into three regions based on the positioning precision prior map and the positioning precision, a buffer zone of a dead zone, the dead zone, and a non-dead zone. The dead zone is a grid zone whose positioning precision of the positioning precision prior map is less than a threshold $Th_{dead}$.

a: Phase of entering the buffer zone of the dead zone

Figure 24:
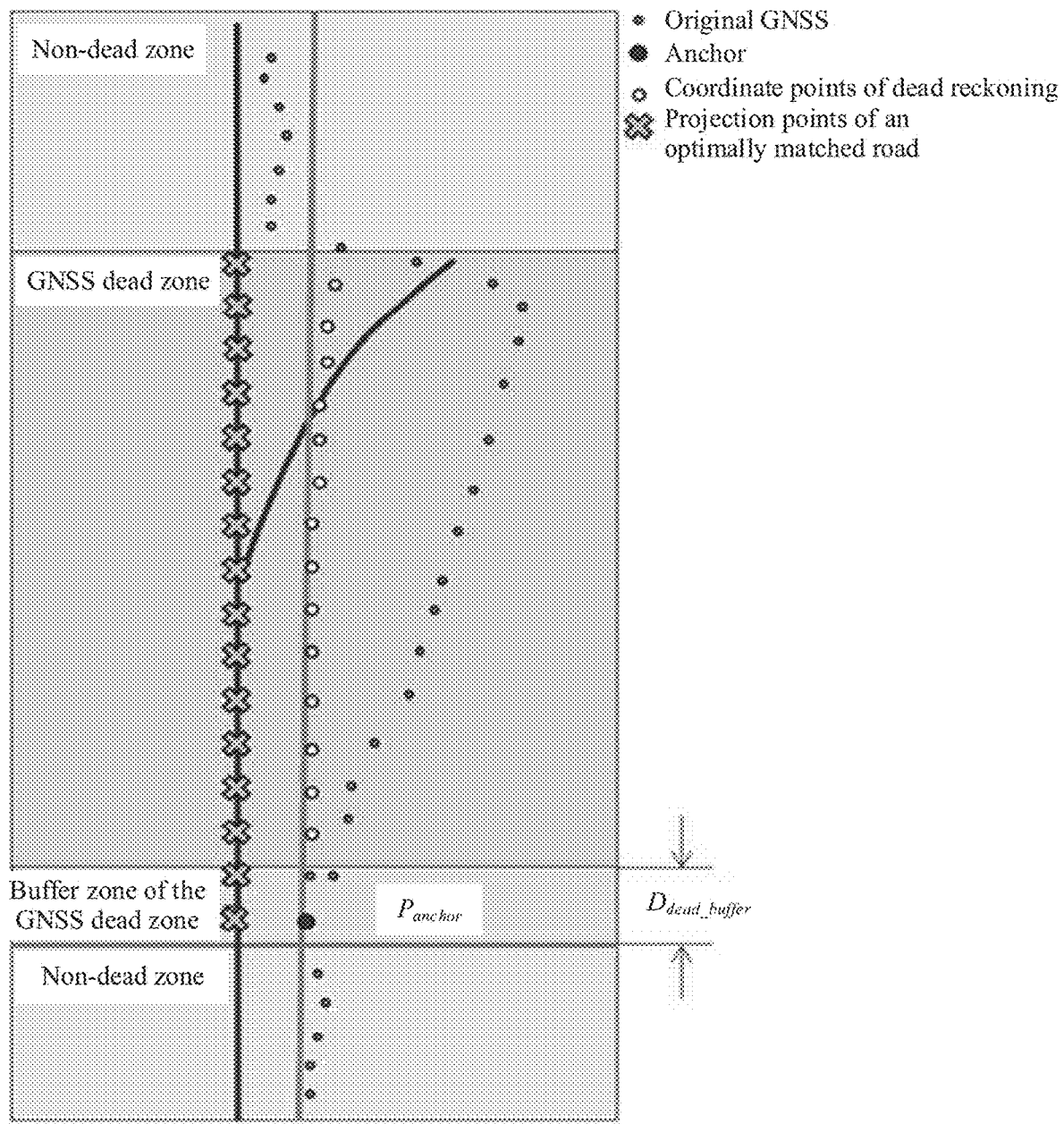
FIG. 24 is a schematic diagram of positioning points and corrected positioning points in regions with different positioning precision according to an embodiment of the present disclosure.

As shown in FIG. 24, a zone in which a vertical projection distance from a vehicle to a dead zone edge grid is less than $D_{dead\_buffer}$ is the buffer zone of the dead zone. Positioning precision of the buffer zone of the dead zone is not very low, and a positioning result is still in a trusted range. Original positioning coordinates are used as anchor $P_{anchor}$ coordinates, and the anchor coordinates are used as the original coordinates in the positioning method provided in the embodiments of this application. An ID of an optimally matched road is output as a target road $Road_{traget}$.

b: Phase of entering the dead zone

Positioning precision of the dead zone may have a relatively large deviation. In the present disclosure, in the phase at which the vehicle enters the dead zone, an anchor point of the buffer zone of the dead zone is used as a start point, and a forward speed and an angular speed of the vehicle are used to perform dead reckoning, to obtain a dead reckoning result $P_{DR}$. Then, the dead reckoning result $P_{DR}$ is used as the original coordinates in the positioning method provided in the embodiments of this application, and the target road $Road_{traget}$ output in the phase a and a road topologically connected to $Road_{traget}$ are used as candidate roads for input. According to the positioning method provided in the embodiments of this application, the optimally matched road is obtained, and the $P_{DR}$ is projected to a road of the navigation map, to obtain a projected point $P_{proj}$ as a positioning result in this case.

c: Phase of leaving the dead zone

When the vehicle leaves the dead zone and a positioning deviation is within an acceptable range, a GNSS result may be directly used or a GNSS positioning result may be used as the original coordinates for input, and a matched road and coordinates of a projected point projected to the road are output.

An embodiment of this application further provides an electronic device. The electronic device includes an obtaining module, a feature calculation module, a selection module, and a road matching module. The obtaining module may be configured to perform the foregoing steps Si and S101. The feature calculation module may be configured to perform the foregoing steps S2, S102 to S105, S301, S401, and S404. The selection module may be configured to perform the foregoing steps S3, S200 to S204, S302 and S303, S402, and S405 to S407. The road matching module may be configured to perform the foregoing step S4. The obtaining module is configured to obtain coordinates of a terminal device, data of a plurality of collection points of a road divider, and features of a plurality of candidate roads. The plurality of candidate roads are roads that are in map data and that are located in a first range of the coordinates of the terminal device. The road divider is an edge of a road on which the terminal device is located, and the plurality of collection points of the road divider are collection points obtained when a sensor collects the road divider.

The feature calculation module is configured to calculate, based on the data of the plurality of collection points of the road divider, a feature of the road on which the terminal device is located. The feature of the road on which the terminal device is located is used to indicate a change in a shape of the road on which the terminal device is located.

The selection module is configured to select a target road from the plurality of candidate roads based on the feature of the road on which the terminal device is located and features of the plurality of candidate roads.

The road matching module is configured to match the coordinates of the terminal device to the target road, to obtain corrected coordinates of the terminal device.

Optionally, the selection module is further configured to determine, based on the feature of the road on which the terminal device is located, a type of the road on which the terminal device is located, and select the target road from the plurality of candidate roads based on the type of the road on which the terminal device is located and types of the plurality of candidate roads.

Optionally, the selection module is further configured to determine, based on the feature of the road on which the terminal device is located, a type of an intersection at which the terminal device is located. The type of the intersection is an intersection of an elevated road or an intersection of a non-elevated road, and the intersection at which the terminal device is located is an intersection at which the terminal device is currently located.

Optionally, the selection module is further configured to, if the feature of the road on which the terminal device is located meets a preset threshold, determine the type of the intersection at which the terminal device is located. The type of the intersection is the intersection of the elevated road or the intersection of the non-elevated road.

Optionally, the obtaining module is further configured to obtain coordinates that are of one or more moving objects and that are collected by the sensor. The coordinates of the moving object are coordinates of the moving object relative to the sensor.

The feature calculation module is further configured to calculate a movement feature of the one or more moving targets based on the coordinates of the one or more moving targets, where the movement feature is used to indicate a movement state of the moving target.

The selection module is further configured to determine, based on the movement feature of the one or more moving targets and the feature of the road on which the terminal device is located, the type of the road on which the terminal device is located.

Optionally, the feature of the road on which the terminal device is located further includes a quantity of lanes of the road on which the terminal device is located. The selection module is further configured to determine, based on the quantity of lanes of the road on which the terminal device is located, whether the terminal device enters or leaves the intersection of the elevated road, and if the terminal device enters or leaves the intersection of the elevated road, determine that the type of the road on which the terminal device is located is the elevated road.

Optionally, the selection module is further configured to calculate a matching degree between each of the plurality of roads and the coordinates of the terminal device. A matching degree of a road that is in the plurality of roads and that has a same type as the road on which the terminal device is located is greater than a matching degree of a road that is in the plurality of roads and that has a different type from the road on which the terminal device is located, and the target road is a road that is in the plurality of roads and that has a highest degree of matching with the coordinates of the terminal device.

Optionally, the selection module is further configured to, if the feature of the road on which the terminal device is located is less than a first threshold, determine that the type of the intersection at which the terminal device is located is the intersection of the elevated road.

Optionally, the selection module is further configured to, if the feature of the road on which the terminal device is located is greater than a second threshold, determine that the type of the intersection at which the terminal device is located is the intersection of the non-elevated road.

Optionally, the movement feature of the one or more moving targets is a movement speed of the one or more moving targets. The selection module is further configured to, if the movement speed of the one or more moving targets is greater than a fourth threshold, determine that the type of the intersection at which the terminal device is located is the intersection of the non-elevated road.

Optionally, the movement feature of the one or more moving targets is a slope of a movement track of the one or more moving targets. The selection module is further configured to, if the slope of the movement track of the one or more moving targets is less than a fifth threshold, determine that the intersection at which the terminal device is located is the intersection of the non-elevated road.

Optionally, the feature of each of the plurality of candidate roads includes a quantity of lanes of each of the plurality of candidate roads. The selection module is further configured to, if the quantity of lanes of the road on which the terminal device is located is greater than the quantity of lanes of each of the plurality of candidate roads, determine that the type of the road on which the terminal device is located is the elevated road.

Optionally, the obtaining module is further configured to obtain course angles of the terminal device at a plurality of moments. The selection module is further configured to, if a variance of the course angles of the terminal device at the plurality of moments is greater than a sixth threshold, determine, based on the quantity of lanes of the road on which the terminal device is located, whether the terminal device enters or leaves the intersection of the elevated road.

Based on the foregoing embodiments, an embodiment of this application further provides a chip subsystem (SOC). The chip subsystem includes an application processor and a GPS module configured to receive a positioning signal. The application processor may implement the positioning method provided in any one or more of the foregoing embodiments. The GPS module may be an independent chip, or may be integrated with the application processor.

Based on the foregoing embodiments, an embodiment of this application further provides an electronic device. The electronic device includes the foregoing chip subsystem and a sensor such that the electronic device can implement the positioning method provided in any one or more of the foregoing embodiments. The sensor is configured to collect data of a road divider and coordinates of one or more moving targets.

Based on the foregoing embodiments, an embodiment of this application further provides a positioning chip, for example, a GPS chip. The chip includes a radio frequency module and a processing module. The radio frequency module is configured to receive a positioning signal, and the processing module is configured to implement the positioning method provided in any one or more of the foregoing embodiments.

Based on the foregoing embodiments, an embodiment of this application further provides an electronic device. The electronic device includes the foregoing positioning chip and a sensor such that the electronic device can implement the positioning method provided in any one or more of the foregoing embodiments. The sensor is configured to collect data of a road divider and coordinates of one or more moving targets.

Based on the foregoing embodiments, an embodiment of this application further provides a computer storage medium. The storage medium stores computer instructions, and when the computer instructions are read and executed by one or more processors, the positioning method provided in any one or more of the foregoing embodiments may be implemented. The computer storage medium may include any medium that can store program code or computer instructions, for example, a Universal Serial Bus (USB) flash drive, a removable hard disk, a read-only memory, a RAM, a magnetic disk, or an optical disc.

Based on the foregoing embodiments, this application provides a computer program product, where the computer program product includes a computer instruction, and when a processor executes the computer instruction, the processor is enabled to perform the positioning method provided in any one or more of the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc (CD)-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine such that the instructions executed by a computer or the processor of the other programmable data processing device generate an apparatus for implementing a specific function in one or more processes in the flowcharts and/or in one or more blocks in the block diagrams.

These computer program instructions may alternatively be stored in a computer-readable memory that can indicate the computer or the other programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded to a computer or another programmable data processing device such that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A positioning method, comprising:
   obtaining coordinates of a terminal device, data of a plurality of collection points of a road divider, and candidate road features describing features of a plurality of candidate roads, wherein the plurality of candidate roads are roads located in a first range of the coordinates of the terminal device, wherein the road divider is located on an edge of a road on which the terminal device is located, wherein the plurality of collection points comprises collection points at which a radar collects data on the road divider, and wherein the data of the plurality of collection points comprises distances between the radar and the collection points or the data of the plurality of collection points are coordinates of the collection points;
   calculating, based on the data of the plurality of collection points, a road feature describing a feature of the road, wherein the road feature indicates a change in a shape of the road;
   selecting a target road from the plurality of candidate roads based on the road feature and the candidate road features; and
   matching the coordinates of the terminal device to the target road to obtain corrected coordinates of the terminal device.

2. The method of claim 1, wherein the candidate road features comprise candidate road types describing types of the plurality of candidate roads, and wherein the method further comprises:
   determining, based on the road feature, a road type describing a type of the road; and
   selecting the target road from the plurality of candidate roads based on the road type and the candidate road types.

3. The method of claim 2, wherein the road type is an elevated road or a non-elevated road, and wherein the candidate road types are an elevated road or a non-elevated road.

4. The method of claim 2, wherein the terminal device is within an intersection range, wherein the method further comprises determining, based on the road feature, an intersection type describing a type of an intersection at which the terminal device is located, and wherein the intersection type is an intersection of an elevated road or an intersection of a non-elevated road.

5. The method of claim 4, wherein the road feature meets a preset threshold, and wherein the method further comprises determining the intersection type.

6. The method of claim 1, wherein the road feature comprises at least one of an average value of slopes of the road divider at the plurality of collection points, a variance of the slopes of the road divider at the plurality of collection points, an average value of distances between the plurality of collection points and the terminal device, or a variance of the distances between the plurality of collection points and the terminal device.

7. The method of claim 1, further comprising:
   obtaining coordinates of a moving target, wherein the coordinates of the moving target are coordinates of the moving target relative to the radar;
   calculating a movement feature of the moving target based on the coordinates of the moving target, wherein the movement feature indicates a movement state of the moving target; and
   determining, based on the movement feature, the road type.

8. The method of claim 7, wherein the movement feature is at least one of a movement speed or a slope of a movement track of the moving target.

9. The method of claim 1, further comprising calculating a matching degree between each of the plurality of candidate roads and the coordinates of the terminal device, wherein the matching degree of a first candidate road that is in the plurality of candidate roads and that has a same type as the road is greater than the matching degree of a second candidate road that is in the plurality of candidate roads and that has a different type from the road, and wherein the target road is a candidate road that is in the plurality of candidate roads and that has a highest degree of matching with the coordinates of the terminal device.

10. An electronic device, comprising:
a memory configured to store instructions; and
a processor coupled to the memory and configured to execute the instructions, which when executed, cause the electronic device to be configured to:
  obtain coordinates of a terminal device, data of a plurality of collection points of a road divider, and candidate road features describing features of a plurality of candidate roads, wherein the plurality of candidate roads are roads located in a first range of the coordinates of the terminal device, wherein the road divider is located on an edge of a road on which the terminal device is located, wherein the plurality of collection points are collection points obtained when a radar collects the road divider, and wherein the data of the plurality of collection points comprises distances between the radar and the collection points or the data of the plurality of collection points comprises coordinates of the collection points;
  calculate, based on the data of the plurality of collection points, a road feature describing a feature of the road, wherein the road feature indicates a change in a shape of the road;
  select a target road from the plurality of candidate roads based on the road feature and the candidate road features; and
  match the coordinates of the terminal device to the target road to obtain corrected coordinates of the terminal device.

11. The electronic device of claim 10, wherein the candidate road features comprise candidate road types describing types of the plurality of candidate roads, and wherein the instructions further cause the electronic device to be configured to:
  determine, based on the road feature, a road type describing a type of the road; and
  select the target road from the plurality of candidate roads based on the road type and the candidate road types.

12. The electronic device of claim 11, wherein the road type is an elevated road or a non-elevated road, and wherein the candidate road types are an elevated road or a non-elevated road.

13. The electronic device of claim 11, wherein the terminal device is within an intersection range, wherein the instructions further cause the electronic device to be configured to determine, based on the road feature, an intersection type describing a type of an intersection at which the terminal device is located, and wherein the intersection type is an intersection of an elevated road or an intersection of a non-elevated road.

14. The electronic device of claim 13, wherein the road feature meets a preset threshold, and wherein the instructions further cause the processor to be configured to determine the intersection type.

15. The electronic device of claim 10, wherein the road feature comprises at least one of an average value of slopes of the road divider at the plurality of collection points, a variance of the slopes of the road divider at the plurality of collection points, an average value of distances between the plurality of collection points and the terminal device, or a variance of the distances between the plurality of collection points and the terminal device.

16. The electronic device of claim 10, wherein the instructions further cause the electronic device to be configured to:
  obtain coordinates of a moving target, wherein the coordinates of the moving target are coordinates of the moving target relative to the radar;
  calculate a movement feature of the moving target based on the coordinates of the moving target, wherein the movement feature indicates a movement state of the moving target; and
  determine, based on the movement feature, the road type.

17. The electronic device of claim 16, wherein the movement feature is at least one of a movement speed or a slope of a movement track of the moving target.

18. The electronic device of claim 10, wherein the instructions further cause the processor to be configured to calculate a matching degree between each of the plurality of candidate roads and the coordinates of the terminal device, wherein the matching degree of a first candidate road that is in the plurality of candidate roads and that has a same type as the road is greater than the matching degree of a second candidate road that is in the plurality of candidate roads and that has a different type from the road, and wherein the target road is a candidate road that is in the plurality of candidate roads and that has a highest degree of matching with the coordinates of the terminal device.

19. A computer program product comprising instructions that are stored on a computer-readable medium and that, when executed by a processor, cause an electronic device to:
  obtain coordinates of a terminal device, data of a plurality of collection points of a road divider, and candidate road features describing features of a plurality of candidate roads, wherein the plurality of candidate roads are roads located in a first range of the coordinates of the terminal device, wherein the road divider is located on an edge of a road on which the terminal device is located, wherein the plurality of collection points are collection points obtained when a radar collects the road divider, and wherein the data of the plurality of collection points comprises distances between the radar and the collection points or the data of the plurality of collection points comprises coordinates of the collection points;
  calculate, based on the data of the plurality of collection points, a road feature describing a feature of the road, wherein the road feature indicates a change in a shape of the road;
  select a target road from the plurality of candidate roads based on the road feature and the candidate road features; and
  match the coordinates of the terminal device to the target road to obtain corrected coordinates of the terminal device.

20. The computer program product of claim 19, wherein the candidate road features comprise candidate road types describing types of the plurality of candidate roads, and wherein when executed by the processor, the instructions further cause the electronic device to be configured to:
  determine, based on the road feature, a road type describing a type of the road; and
  select the target road from the plurality of candidate roads based on the road type and the candidate road types.

* * * * *